(12) United States Patent
Oren et al.

(10) Patent No.: US 10,659,310 B1
(45) Date of Patent: *May 19, 2020

(54) DISCOVERING AND MAPPING THE RELATIONSHIPS BETWEEN MACRO-CLUSTERS OF A COMPUTER NETWORK TOPOLOGY FOR AN EXECUTING APPLICATION

(71) Applicant: LogicMonitor, Inc., Santa Barbara, CA (US)

(72) Inventors: Gadi Oren, Cambridge, MA (US); Ran Gilboa, Cambridge, MA (US)

(73) Assignee: LogicMonitor, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/543,372

(22) Filed: Aug. 16, 2019

(51) Int. Cl.
*H04L 12/24* (2006.01)
*H04L 12/751* (2013.01)

(52) U.S. Cl.
CPC .......... *H04L 41/12* (2013.01); *H04L 41/0803* (2013.01); *H04L 41/22* (2013.01); *H04L 45/02* (2013.01); *H04L 41/065* (2013.01); *H04L 41/0893* (2013.01)

(58) Field of Classification Search
CPC ..... H04L 43/00; H04L 43/022; H04L 43/026; H04L 43/04; H04L 43/06; H04L 43/067; H04L 41/12; H04L 41/0893; H04L 41/22; G06F 16/288; G06F 11/30; G06N 20/00
See application file for complete search history.

(56) References Cited

U.S. PATENT DOCUMENTS

2019/0095478 A1* 3/2019 Tankersley .......... G06F 16/2365
2019/0171966 A1* 6/2019 Rangasamy .......... G06N 20/00

* cited by examiner

*Primary Examiner* — Tom Y Chang
(74) *Attorney, Agent, or Firm* — SoCal IP Law Group LLP; Angelo Gaz; Steven Sereboff

(57) ABSTRACT

There are disclosed devices, system and methods for mapping relationships between macro-clusters of a network object topology of a computer communication network. A remote network object of the network is selected that has a relationship with one macro-cluster that has a relationship with another macro-cluster. Flow log data, metric data and configuration data are gathered from at least the selected network object. Configuration data and time data are generated for the sets network objects of the two macro-clusters using the gathered flow log data, metric data and configuration data. Network topology information is created using the configuration data and time data. The network topology information includes topology information for the relationship between the macro-clusters, for each macro-cluster and for the sets of network objects of the macro-clusters. The topology information can be stored and used to determine whether performance issues occur in the macro-clusters or relationship over time.

18 Claims, 8 Drawing Sheets

400

US 10,659,310 B1

DISCOVERING AND MAPPING THE RELATIONSHIPS BETWEEN MACRO-CLUSTERS OF A COMPUTER NETWORK TOPOLOGY FOR AN EXECUTING APPLICATION

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to discovering and mapping relationships between macro-clusters of a computer network topology for an executing application.

Description of the Related Art

Current computer network topology mapping tools or devices are generally unable to automatically discover the topology of network objects of a network communicating with an application at a large scale, store the topology and allow quick access to the topology information. Some such tools require access to sensitive information. Some do not perform repeated discovery, compare changes, addressing large scale and dealing with missing critical data. Some do not automatically group resources (like a cluster or a service) or collect critical metrics for each network object. Such tools also do not provide a graph representation of the topology that mixes data that is not pure graphical and/or that has data with time dimension. They also do not provide such a representation that maps relationships between macro-clusters of the topology.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Technologies described herein provide systems and methods for continual automated discovering over time of a topology of network objects of a selected application executing on a computer communication network. The technologies also provide systems and method for discovering and mapping the relationships between macro-clusters of the topology. The system may be an efficient information technology (IT) discovery engine existing as two physical network objects of the computer network that accesses the network object on which the application is executing.

Herein, a network "topology" may be or include the network's "topology information." Also, herein, "discovering" the relationships between macro-clusters may be part of the continual automated discovering over time of the topology. Next, herein, "mapping" the relationships between macro-clusters may be part of creating topology information and/or displaying a graphic representation of the topology information. Also, herein, the "relationship" between two macro-clusters may be or have at least one type of relationship and/or at least one type of communications between two macro-clusters. For example, a relationship between two macros-clusters may be all the relationships between each network object of one macro-cluster and each network object of the related macros-cluster which may include all of the types of relationships between each related two network objects of those macro-clusters. Finally, herein, the "relationship" between two macro-clusters may also include the topology information of the network objects included in the two macro-clusters.

Description of Apparatus

Figure 1A:
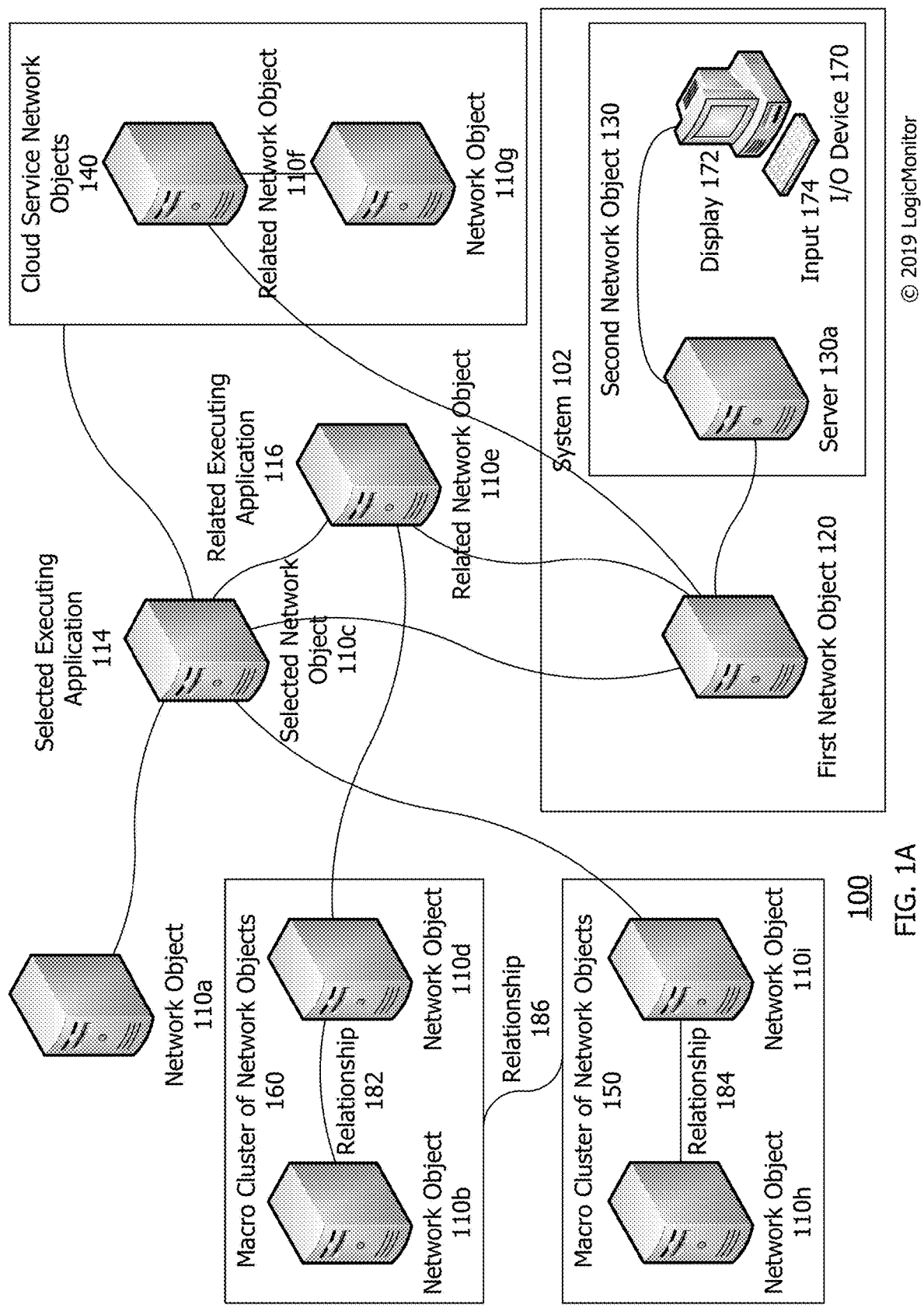
FIG. 1A is a computer communication network having a system for discovering and mapping the relationships between macro-clusters of topology information for a selected application executing on a selected network object.

Referring now to FIG. 1A, there is shown a computer communication network 100 having a system 102 for discovering and mapping the relationships between macro-clusters of topology information; and/or displaying a graph representation of those relationships. The relationships are part of topology information of network objects for a selected application 114 executing on a selected network object 110c. In some cases, the "discovering" of relationships also includes some manual intervention to input part of the topology information or relationships of one or more network objects. The computer communication network 100 is a computer network or network that includes the network objects 110a-110i, 120 and 130. The software application 114 is executing or running on the network object 110c. The related executing application 116 is executing or running on the network object 110e. The network objects 110a, 110c and 110e are independent or stand-alone network objects.

The network objects 110b and 110d are part of macro-cluster of network objects 160 which is a macro-cluster group of network objects, a micro-service group of network objects and/or a macro-component group of network objects. The network objects 110f and 110g are part of a cloud service network objects 140 which is a macro-cluster group of network objects, a micro-service of network objects, and/or a macro-component group of network objects. The network objects 110h and 110i are part of macro-cluster of network objects 150 which is a macro-cluster group of network objects, a micro-service group of network objects and/or a macro-component group of network objects. The cloud service network objects 140 is not related to and has no type of relationship with either the macro-cluster 150 or 160. The macro-cluster 150 is related to, has a relationship 186 with and has a type of relationship with the macro-cluster 160.

In another case that is not shown the figures, the selected object 110c is included in and part of macro-cluster of network objects 160. Also, in another case that is not shown the figures, the related object 110e is included in and part of macro-cluster of network objects 150. In fact, those objects may be part of those clusters at the same time.

Each of the network objects 110a-110i, 120 and 130 may be a physical network object, a virtual network object or another network element. Any number of those network objects are related to the application 114 such as by influencing the execution of, receiving data from and/or sending data to the application 114. A physical network object or a type of physical network object is at least one of a physical host, a physical disk (e.g., within a server or attached to a server in a cloud situation), a physical load balancer, a server, a client, a physical internal service, a desktop, a router, a node, a network switch, a laptop or other computing device, such as device 500 FIG. 5. A virtual network object or type of virtual network object is at least one of a virtual host, a virtual disk, a virtual load balancer, a database, a logical clustered group of resources, a macro-component, a virtual macro-cluster of network objects, a physical macro-cluster of network objects, a logical service, a virtual internal service, a virtual computing device, that exists on or is a device 500 FIG. 5. Each of the network objects may include at least one communication interface for communicating with at least one other network object, such as interface 516 in FIG. 5.

In some cases, application 114 has parts or plug-ins executing on another network object; or is communicating data with another network object. For example, network object 110e is related to object 110c and has related executing application 116 that is related to the application 114 because the applications 114 and 116 are communicating data with each other as a result of the execution of application 116. For example, the application 114 may be a server application which is sending webpage data to the application 116 which is a client application displaying the webpage to a user, and the topology for the server is being determined. It can be appreciated that this relationship of the applications 114 and 116 could be reversed and the system 102 would be mapping out the topology for the client computer. Also, the object 110f is related to the object 110c because the application 114 is obtaining data through the object 110f from a disc or database of the object 110g. For example, the object 110f may be a router or Internet switch which is routing advertisements from ad server source object 110g to the application 114. Network object 110b has relationship 182 with object 110d by having at least one type of relationship between network object 110b and object 110d. Network object 110h has relationship 184 with object 110i by having at least one type of relationship between network object 110h and object 110i. Macro-cluster 150 has relationship 186 with macro-cluster 160 by having at least one relationship between macro-cluster 150 and macro-cluster 160. The relationship 186 is any relationship between one of the network objects of macro-cluster 150 and one of the network objects of macro-cluster 160. For example, relationship 186 may be a relationship between network object 110b and network object 110i. Relationship 186 can include additional relationships between network objects of macro-cluster 150 and 160 such as by also including a relationship between network objects 110b and 110h; 110d and 110h; and/or 110d and 110i. Each of these relationships between macro-clusters and/or network objects may be one or more of many types of relationships as noted herein. Other relationships between network objects of network 100 are also considered as noted herein and the network objects related to application 114 will be included in the topology information.

Figure 1B:
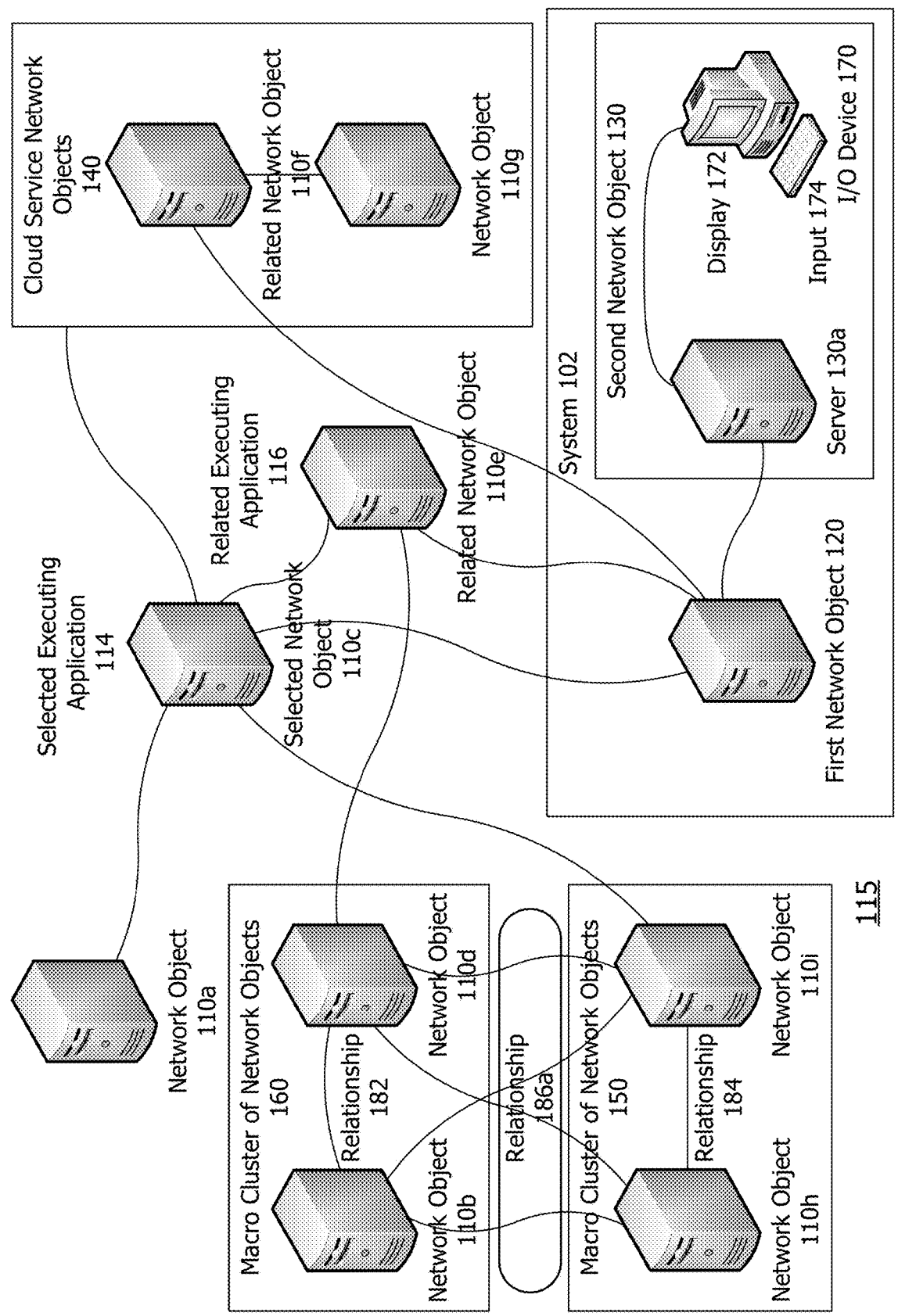
FIG. 1B is a computer communication network showing certain relationships between two specific macro-clusters for a selected application executing on a selected network object.

Specifically, FIG. 1B is a computer communication network 115 showing certain relationships between two specific macro-clusters 150 and 160 for a selected application 114 executing on a selected network object 110c. The computer communication network 115 may be similar to network 100 where relationship 186 is or includes at least one relationship between each of the network objects of macro-cluster 150 and each of the network objects of macro-cluster 160. Here, as shown, relationship 186 may be a relationship 186a between macro-clusters 150 and 160 that is a relationship between network object 110b and network object 110h, a relationship between network object 110b and network object 110i, a relationship between network object 110d and network object 110h, and a relationship between network object 110d and network object 110i. Each of these relationships between network objects may be one or more of many types of relationships as noted herein. These relationships between network objects of network 115 have relationship types and will be included in the topology information as noted herein.

Figure 1C:
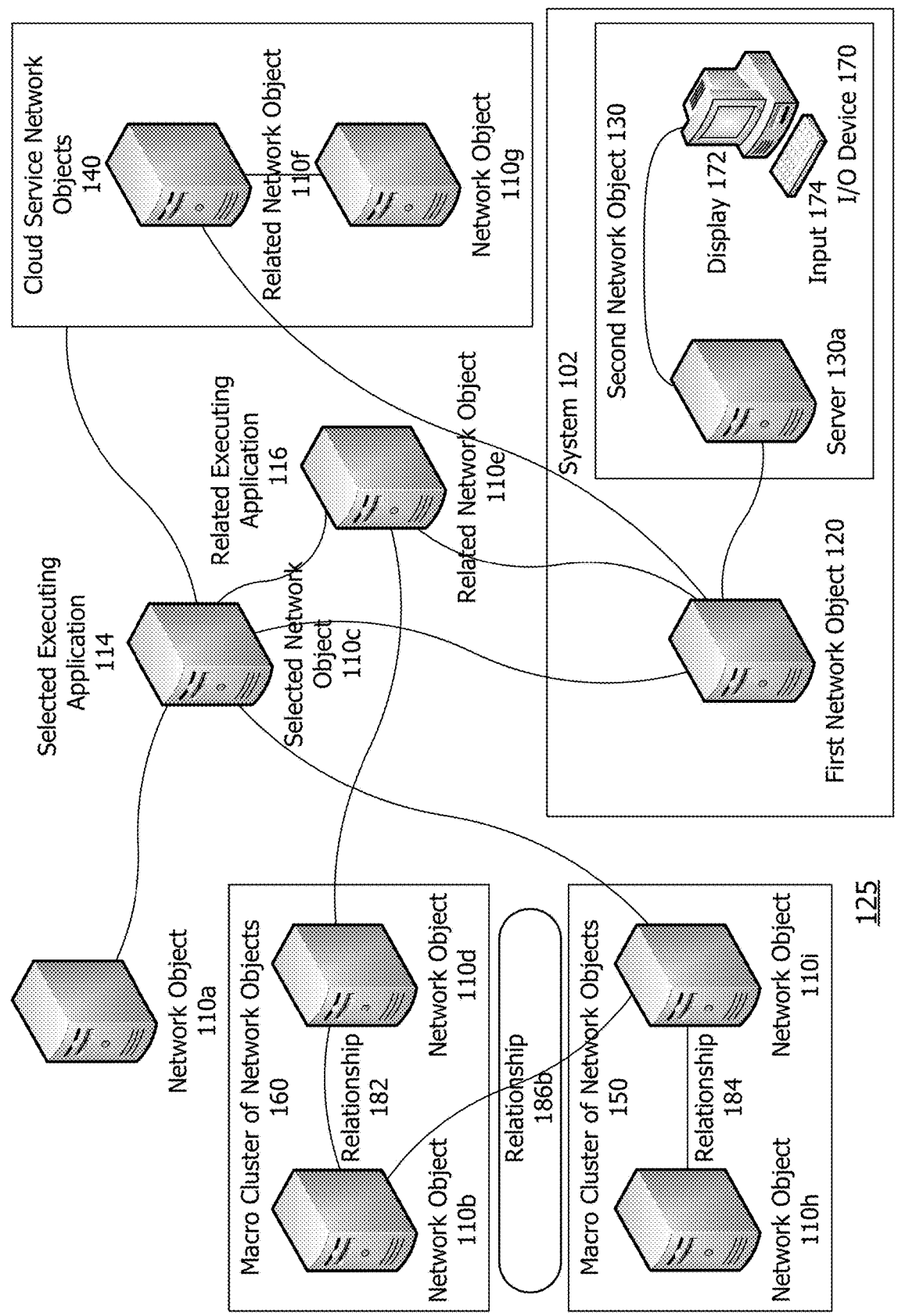
FIG. 1C is a computer communication network showing certain relationships between two specific macro-clusters for a selected application executing on a selected network object.

FIG. 1C is a computer communication network 125 showing certain relationships between two specific macro-clusters 150 and 160 for a selected application 114 executing on a selected network object 110c. The computer communication network 125 may be similar to network 100 where relationship 186 is or includes only one relationship between one of the network objects of macro-cluster 150 and one of the network objects of macro-cluster 160. Here, as shown, relationship 186 may be a relationship 186b between macro-clusters 150 and 160 that is the relationship between network object 110b and network object 110i. This relationship between network objects may be one or more of many types of relationships as noted herein. This relationship will have a relationship type and will be included in the topology information as noted herein.

Figure 1D:
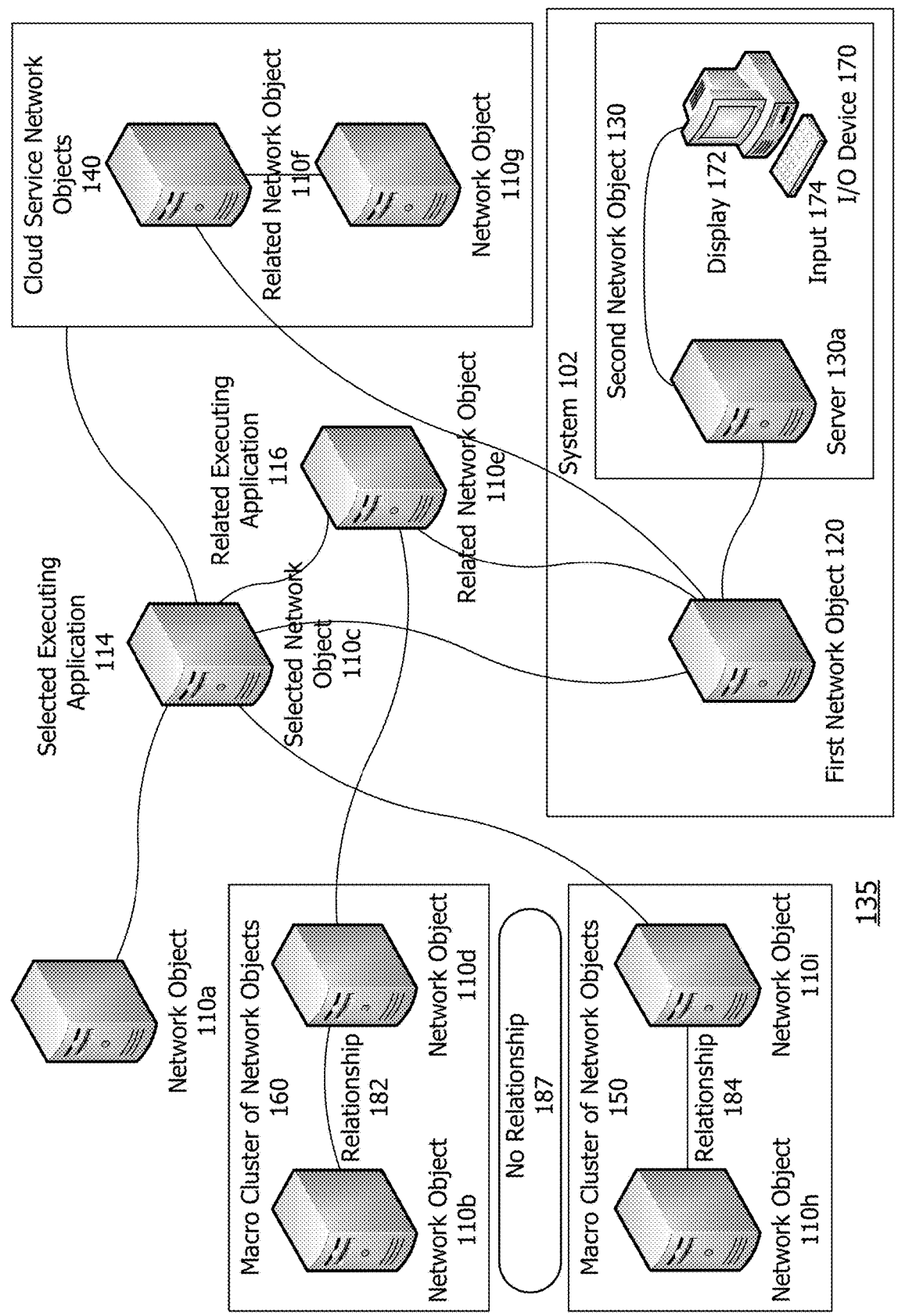
FIG. 1D is a computer communication network showing no relationships between two specific macro-clusters for a selected application executing on a selected network object.

FIG. 1D is a computer communication network 135 showing no relationships between two specific macro-clusters 150 and 160 for a selected application 114 executing on a selected network object 110c. The computer communication network 135 may be similar to network 100 where relationship 186 is or includes zero or no relationship between any of the network objects of macro-cluster 150 and any of the network objects of macro-cluster 160. Here, as shown, there is no relationship 186 between macro-clusters 150 and 160. That there is no relationship will be included in the topology information as noted herein.

The network 100 includes the network object 120 and the separate network object 130 which together are the system 102. The system 102 may include additional components. In one case, the objects 120 and 130 may be the same network object. The network object 130 includes the server 130*a* and may include the user input/output (IO) device 170 having the display 172 and the user input 174. The server 130*a* may be a network object as noted herein. The device 170 may be a server, client, desktop, laptop or other computing device, such as noted for device 500 FIG. 5. The display 172 may be or include a computer display, touchscreen or other device capable of rendering or displaying computer graphics. The input 174 may be or include a computer input device, such as a keyboard, mouse, touchpad, touchscreen, voice activated input and/or the like.

The network 100 includes and FIG. 1A shows network connections between the network objects, as shown by the lines connecting pairs of the network objects. Specifically, the object 120 is connected to the objects 110*c*, 110*e* and 110*f*. Also, the object 110*c* is connected to the objects 110*a*, 110*ei*, 120, 140 and 110*i*. The object 110*b* is connected to the object 110*d*; the object 110*i* is connected to the object 110*h*; the object 110*d* is connected to the object 110*e*; and the object 110*f* is connected to the object 110*g*. Each connection may represent a connection between the network interfaces of each of the objects being connected. Such connections may be or include network: connections communication channels, routers, nodes, network switches, hardware, software, wired connections, wireless connections and/or the like. In some cases, each connection may represent one of different possible types of relationships like a physical connection, a logical connection, a dependency relationship and/or any other type of relationship between the two objects. Each connection may be a relationship and/or a type of relationship between one or more pairs of network objects. Thus, for each connection, the pair of objects and any macro-clusters in which those objects exist are related. Each network connection may be capable of being used to communicate network data, packets, network messages, calls, signals, streams, arrays, flagged samples and feedback described herein.

The "selected" application 114 is an application, a component, and/or a network object of a network that it is desired to discover the network topology or topology information of. The network object 110*c* is a "selected" object such as by being the selected network object and/or a network object upon which the selected software application 114 is executing. For example, the network 100 may be an environment in which the system 102 can continually and automatically discover over time, a topology of the network 100 that is involved in execution of or accessed during execution of the selected application 114 which is executing on the network object 110*c* thus making object 110*c* a "selected" network object.

The "selected" application 114 may be an application, a component, and/or a network object that it is believed has a relationship with or will provide configuration and time data 217 to show network topology information desired to discover the network topology or topology information of related macro-clusters 150 and 160. As noted above, the selected object 110*c* may be separate from or included in a macro-cluster 150. In these cases, for example, the network 100 may be an environment in which the system 102 can continually and automatically discover over time, a topology of the related macro-clusters 150 and 160 that are related to the execution of or accessed during execution of the selected application 114, thus making object 110*c* a "selected" network object.

The selected application 114 may be selected by a user having access to system 102. The user may be an analyst, administrator, or other person; or a software application having access to the system 102. The input 174 of the input/output (I/O) device 170 may be used by the user to select (e.g., predetermine or identify) the selected application 114, that it is desired to discover the topology of. This selection may cause the system 102 to perform continual automated discovering over time of the topology of network objects for or communicating with the executing application 114. Discovering the topology may occur for a selected period of time and for additional subsequent periods of time as noted herein.

Figure 2:
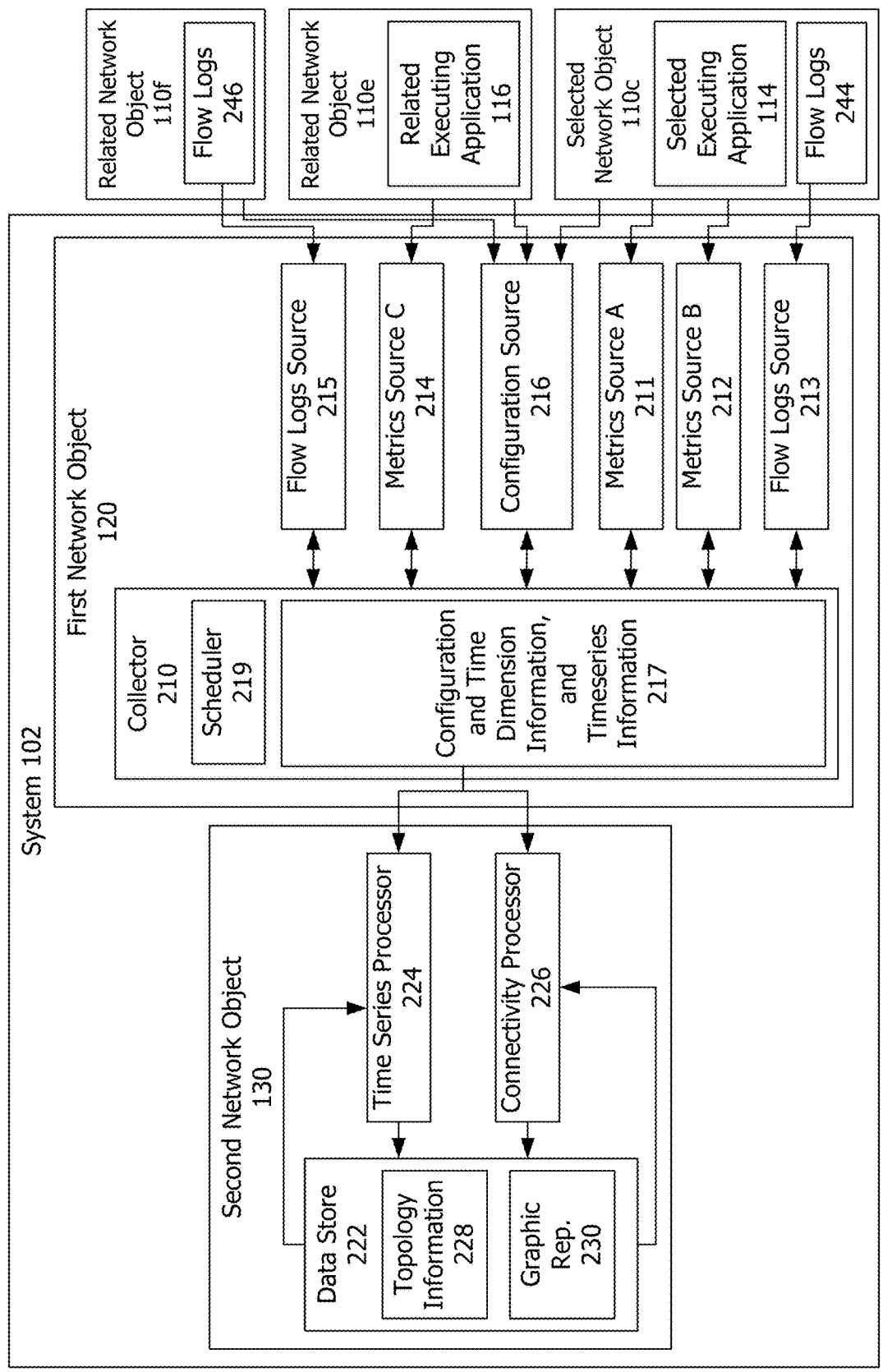
FIG. 2 is a portion of the network of FIG. 1A that includes the system for discovering and mapping the relationships between macro-clusters and the selected executing application.

Referring now to FIG. 2, there is shown a portion 200 of network 100 that includes the system 102 and the selected executing application 114 executing on the network object 110*c* of FIG. 1A. The network object 120 is connected by network connections to and between the network object 130 and: the selected network object 110*c*, the related network object 110*e* and the related network object 110*f* as shown.

The network object 120 includes at least a collector 210, a scheduler 219, configuration and time dimension information (CTD), and timeseries (TS) information 217, and two or more of sources 211-216 for sending the information 217 to the collector 210. Herein, the information 217 may be referred to in separate parts as a configuration and time dimension information (CTD) part, and a timeseries (TS) information part of the information 217. It may also be referred to together as the CTD and TS information 217. The two or more sources includes a configuration source and at least either a flow logs source or a metrics source. Additional sources may also be used to collect the information 217.

In some cases, there is one configuration source that is connected to each network object the collector 210 is collecting the information 217 from. The configuration source may collect configuration information regarding how each network object is configured that is used to produce the information 217. There is also a number of metric sources connected to any number of the network objects the collector 210 is collecting the information 217 from. Each metrics source may collect metrics information regarding a type of metrics for a network object that is used to produce the information 217. More than one metric source can be connected to any single network object to collect more than one type of metrics from that object. There is also a number of flow logs sources, each connected to any of the network objects the collector 210 is collecting the information 217 from. Each flow logs source may collect flow logs information for or from a network object that is used to produce the information 217. Each flow logs source can be reading or copying the flow logs of a switch, node or flow logs providing service.

As shown in FIG. 2, the object 120 has a metrics source A 211, a metrics source B 212, a flow logs source 213, and a configuration source 216 for collecting the information 217 from the selected object 110*c* and/or the selected application 114. More specifically, the configuration source 216 is connected by network connections to and receives configuration information from the selected object 110*c* as part of the information 217. It may detect configuration information of or for the selected object 110*c* based on the execution of the application 114 and send that configuration information to the collector 210. For example, configuration source 216 may be collecting configuration information such as text identifying internet protocol (IP) addresses, logical media access control (MAC) address, physical MAC address, internal disc types, CPU types, random access memory (RAM) memory types, read only memory (ROM)

data, switch/node configuration data, switch data routing data, and other configuration data of each network object.

Next, the metrics source A 211 and the metrics source B 212 are connected by network connections to and receive metrics information from the selected object 110*c* as part of the information 217. They may collect and send to the collector 210 two different types (e.g., type A and B) of metrics information as based on the execution of the application 114. For example, the metrics source A 211 may be collecting the metrics information of the memory, computer processing unit (CPU) and inputs/outputs (IOs) performed by one hard drive (e.g., by disk 1) of the object 110*c*; while the metrics source B 212 is collecting the metrics information of the inputs/outputs (IOs) performed by a second hard drive (e.g., by disk 2) of the object 110*c*.

Also, the flow logs source 213 is connected by network connections to and receives data from the flow logs 244 of or within the selected object 110*c* as part of the information 217. In some cases, as noted further below, each flow log of the logs 244 may include data in all or some of the following fields: version, account-id, interface-id, srcaddr, dstaddr, srcport, dstport, protocol, packets, bytes, start, end, action, log-status. The source 213 may read the flow logs 244 and send all or part of those logs as flow logs information to the collector 210. For example, the flow logs source 213 may be collecting or reading flow logs information including the source network object (e.g., source IP address), target network object (e.g., target IP address) and possibly type of communication of the communication messages of the flow logs for the network communication traffic at or flowing through the object 110*c*. As noted, the network object 110*e* is related to the object 110*c* due to data communication between applications 114 and 116. Thus, the flow logs information of information 217 collected from the object 110*c* may include flow logs 244 of the communication between the applications 114 and 116, and/or the objects 110*c* and 110*e*. Also, as noted, the network object 110*f* is related to the object 110*c* because the application 114 is obtaining data from the object 110*g* through the object 110*f*. Thus, the configuration information and/or metrics information of information 217 collected from the object 110*c* may include information related to the communication between the objects 110*c* and 110*f*.

The network object 110*b* has relationship 182 with object 110*d*, the object 110*d* is related to the object 110*e*, and the object 110*e* is related to object 110*c*. Thus, any of the flow logs information (e.g., data), configuration information and/or metrics information of information 217 collected from the object 110*c*, 110*e* and/or 110*f* may include information identifying the relationship 182 between the objects 110*b* and 110*d*.

The network object 110*h* has relationship 184 with object 110*i*, and the object 110*i* is related to the object 110*c*. Thus, any of the flow logs information (e.g., data), configuration information and/or metrics information of information 217 collected from the object 110*c*, 110*e* and/or 110*f* may include information identifying the relationship 184 between the objects 110*h* and 110*i*.

The macro-cluster 150 has relationship 186 with the macro-cluster 160, and the object 110*i* is related to the object 110*c*. Thus, any of the flow logs information (e.g., data), configuration information and/or metrics information of information 217 collected from the object 110*c*, 110*e* and/or 110*f* may include information identifying the relationship 186 between the macro-cluster 150 and macro-cluster 160. This information may include information identifying one or more types of relationships between the macro-clusters 150 and 160. It may also, include information identifying relationships any of the network objects of macro-cluster 150 have with any of the network objects of macro-cluster 160.

Further, as shown in FIG. 2, the object 120 has a metrics source C 214, and the configuration source 216 for collecting the information 217 from the related object 110*e*. The metrics source C 214 is connected to and receive metrics information from the related network object 110*e*; and send that as the TS part of the information 217 to the collector 210 such as noted for the metrics sources A 211 and B 212 collecting the metrics information of the object 110*c*. The configuration source 216 is connected to and receives configuration information from the related object 110*e*; and sends that as the CTD part of the information 217 to the collector 210 such as noted for the configuration source 216 collecting the configuration information of the object 110*c*. As noted, the network object 110*e* is related to the object 110*c* because the application 114 is a server application which is sending webpage data to the application 116 which is a client application displaying the webpage to a user. Thus, the configuration information and/or metrics information of information 217 collected from the object 110*e* may include information related to the communication between the objects 110*c* and 110*e*.

In addition, as shown in FIG. 2, the object 120 has a flow logs source 215 and the configuration source 216 for collecting the information 217 from the related object 110*f*. The flow logs source 215 is connected to and receives flow logs information from the flow logs 246 of the related network object 110*f*; and sends that as part of the CTD part of the information 217 to the collector 210 such as noted for the flow logs source 213 reading the flow logs 244 of the object 110*c*. The configuration source 216 is connected to and receives configuration information from the related object 110*f*; and sends that as part of the CTD part of the information 217 to the collector 210 such as noted for the configuration source 216 collecting the configuration information of the object 110*c*. As noted, the network object 110*f* is related to the object 110*c* because the application 114 is obtaining data from the object 110*g* through the object 110*f*. Thus, this flow logs information of information 217 collected from the object 110*f* may include flow logs 246 of the communication between the objects 110*c* and 110*f*.

The sources 211-216 are connected to receive the source information (e.g., configuration information, flow log information and metrics information) from the network objects; and transmit the information to collector 210 as the information 217. The information 217 may be periodically transmitted by the sources to the collector, such as tens or hundreds of times during each selected period of time (e.g., see 360 of FIG. 3).

Each of the sources 211-216 may be a pluggable application program interfaces (API) source. In some cases, each of the sources 211-216 is a "pluggable" data source or collector that can be deployed in runtime or during operation of the system 102 to enable process 300 of FIG. 3 to be performed for various examples of the network 100, the selected application 114, the period of time, the subsequent period of time, and the time between an end of the period of time and a beginning of the subsequent period of time. Using pluggable sources also allows those sources to be deployed by the system 102 during subsequent periods of time to expand the system 102 or fix pluggable sources that do not function correctly. This can enable non-disruptive break/fix cycles for the system 102.

Figure 3:
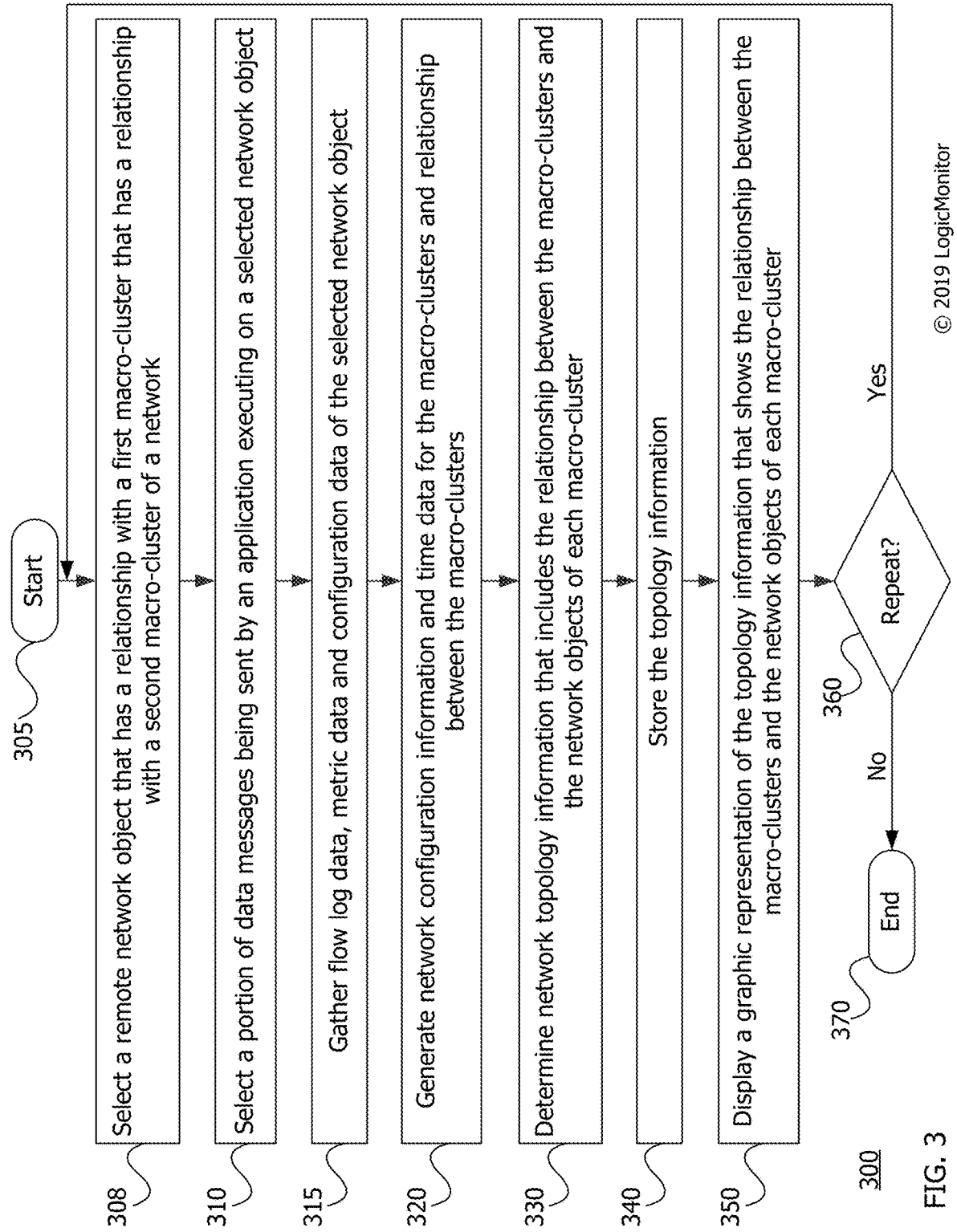
FIG. 3 is an operating environment/process for discovering and mapping the relationships between macro-clusters of the topology information of the selected executing application of the computer communication network.

The collector 210 also includes a scheduler 219 for scheduling time periods for and determining whether to automatically repeat the continual automated discovering of the topology information (e.g., see 360 of FIG. 3). In some cases, the scheduler 219 exists on the object 130 and/or as part of data store 222. The collector 210 also includes the CTD and TS information 217 determined based on the source information collected from sources 211-216; and for being sent to the network object 130. The information 217 may be periodically transmitted by the collector to the network object 130, such as tens or hundreds of times during each selected period of time (e.g., see 360 of FIG. 3).

The network object 130 includes at least a data store 222, a time series processor 224 and a connectivity processor 226. The time series processor 224 and connectivity processor 226 are connected by network connections to and receive information 217 from the collector 210 as shown.

In some cases, a network configuration and time dimension information (CTD) part of the information 217 from the sources 211-216 is the configuration information collected by source 216 and the flow logs information collected by the source 213 for the application 114 and the network objects related to the application 114. In these cases, the CTD part of the information 217 is sent to the connectivity processor 226, which processes that information to determine or create unique keys of, types of objects of, types of relationships between pairs of, groupings of and time dimension data of the network objects part of the topology information 228. The time dimension data may show and/or show changes over time in the topology configuration or topology information 228 over time, such as changes in the existence of, types of objects of, types of relationships between pairs of, and groupings of the network objects. It is considered that in certain cases, the TS part of the information 217 may also be processed by the processor 226 to determine or create unique keys of, types of objects of, types of relationships between pairs of, groupings of and time dimension data of the network objects part of the topology information 228.

In these cases, the timeseries information (TS) part of the information 217 from the sources 211-216 is the metrics information (e.g., timeseries data) collected by metrics sources 211 and 212 for the application 114 and the network objects related to the application 114. In these cases, this TS part of the information 217 is sent to the time series processor 224, which processes that information to determine or create timeseries data part of the topology information 228. The timeseries data may show and/or show changes over time in the performance metrics of the network objects of the topology configuration or topology information 228. It is considered that in certain cases, the CTD part of the information 217 may also be processed by the processor 224 to determine or create the timeseries data part of the topology information 228.

The CTD and TS part of information 217 includes the CTD and TS information for each of relationships 182, 184 and 186; and for each of the network objects 110*b*, 110*d*, 110*h* and 110*i*. The CTD and TS information for relationships 182, 184 and 186; and the network objects 110*b*, 110*d*, 110*h* and 110*i* is generated using at least the gathered flow log data, metric data and configuration data gathered by the flow log sources, metrics source and configuration source of object 120.

The CTD and TS part of information 217 for each of the network objects 110*b* and 110*d* is the CTD and TS information for the set of the network objects of the macro-cluster 150. The CTD and TS part of information 217 for each of the network objects 110*h* and 110*i* is the CTD and TS information for the set of the network objects of the macro-cluster 160.

The CTD and/or TS part of information 217 for relationships 186 may be a macro-cluster CTD and/or TS part of information 217 for the relationship between macro-clusters 150 and 160. In some cases, the one or more types of relationship (e.g., of relationship 186) between macro-clusters 150 and 160 is the one or more types of relationships that exists between objects 110*b* and 110*i*. In some cases, the types of relationships between macro-clusters 150 and 160 includes other types of relationships between other ones of network objects 150 and 160, such as types of relationships existing between objects 110*b* and 110*h*; 110*d* and 110*h*; and/or 110*d* and 110*i*. In other case, the one or more types of relationships between macro-clusters 150 and 160 is one or more types of relationships that can only exist between macro-clusters and is different than any type of relationship between network objects. The relationship and type of relationship between macro-clusters 150 and 160 may be a relationship between a logical abstraction one level up from the objects of macro-cluster 150 and 160. In some cases, the relationship and type of relationship between macro-clusters 150 and 160 may be a relationship between the unique keys for the macro-cluster 150 and 160.

The TS part of information 217 may be optional and excluded in some cases.

The time series processor 224 and the connectivity processor 226 are also connected to and transmit the topology information 228 to the data store 222 based on or determined from the information 217 received from the collector 210 and data received from the data store 222 as shown. This topology information 228 may be periodically transmitted from processors 224 and 226 to the data store 222 as noted for periodic transmission of information 217.

The data store 222 includes the stored topology information 228 that is received from the time series processor 224 and the connectivity processor 226. The data store 222 also includes graph representations 230 for displaying (e.g., creating and/or displaying) various graph representations of topology information 228.

The topology information 228 and graph representations 230 are created using the CTD and TS information for each of relationships 182, 184 and 186; and for each of the network objects 110*b*, 110*d*, 110*h* and 110*i*. The topology information 228 and graph representations 230, each include a mapping of at least one type of relationship between the macro-cluster 150 and the macro-cluster 160. In one example, relationship 186 may be or include that the network object 110*b* of macro-cluster 150 is communicating with, has a link with and/or has a type of communication relationship with the network object 110*i* of macro-cluster 160.

The topology information 228 and graph representations 230, each include a mapping of topology information of the set of the network objects 110*b* and 110*d* of the macro-cluster 150. This may be or include that the network object 110*b* is communicating with, has a link with and/or has a type of relationship with the network object 110*d*; and that both of these objects are a part of macro-cluster 150. It can be appreciated that there may be other network objects in the set of network objects of macro-cluster 150 and that each of these other network objects in the set will be have a type of relationship with at least one other network object of macro-cluster 150.

The topology information 228 and graph representations 230, each include a mapping of topology information of the set of the network objects 110*h* and 110*i* of the macro-cluster 160. This may be or include that the network object 110*h* is communicating with, has a link with and/or has a type of relationship with the network object 110*i*; and that both of these objects are a part of macro-cluster 160. It can be appreciated that there may be other network objects in the set of network objects of macro-cluster 160 and that each of these other network objects in the set will be have a type of relationship with at least one other network object of macro-cluster 160.

The data store 222 is connected to and transmits the topology information 228 back to the time series processor 224 and the connectivity processor 226. For example, the processing of the information 217 performed by processors 224 and 226 to determine topology information 228 may depend on (1) the new data coming in as information 217, and (2) the state of the topology information 228 is it currently exists and as it was in the past. The information about the past state of topology information 228 is already stored in the data store 222, such as past versions of topology information 228. The state of the topology information 228 is it currently exists and as it was in the past flows along the two arrows from 222 to 224 and 226. This topology information 228 may be periodically transmitted from the data store 222 to processors 224 and 226 as noted for information 217.

The network object 120 may represent a first "agent" such as hardware and/or software executing on a first network object or in a first "cloud". A cloud is one or more servers or sets of computing devices that are located separately from each other, such as across a network interface or connection. The network object 130 may represent a second "agent" such as hardware of and/or software executing on a second network object or in a second "cloud".

The first and second network objects or agents communicate with each other to perform the continual automated discovering of the topology for the executing application 114. In some cases, the object 120 or the first agent may be described as a state maintaining or service provider side or cloud of the system; and the object 130 or the second agent may be described as a remote or customer side or cloud of the system. In one example, the objects 120 and 130 are generic physical network object architectures that achieve detecting the topology information in a way that is independent of a specific cloud provider, such as the Amazon Cloud™, Microsoft Cloud™ or Google Cloud™. In this case, the object 110*c* may be cloud based, such as including a cloud based router, switch or flow logs providing service (e.g., cloud provider service by Google Cloud™), and the flow logs are virtual private cloud (VPC) flow logs for network communication being performed by the object 110*c*.

In some cases, the objects 120 and 130 are not limited to being implemented in a cloud. They can function very well with an on-premise or local area network (LAN) installation. In this situation instead of using flow logs source 213 and 215 to read flow logs, those sources could read equivalent "flow logs" of a local switch, router, service and the like which are very similar to VPC flow logs and can be produced by some hardware switches.

Using the system 102 and the connections shown it is possible to perform continual automated discovering over (e.g., during) a selected period of time (and optionally subsequent periods of time) of the topology of network objects for the selected executing application 114. Using the system 102 and the connections shown it is possible to perform continual automated discovering over (e.g., during) a selected period of time (and optionally subsequent periods of time) of the topology of and map the relationships between macro-clusters of the network objects. Displaying the graph representation of this topology and these relationships is one type of use of the discovered topology information 228. In addition to that functionality of visualization, the topology information 228 has other important uses. Specifically, the topology information 228 includes a representation of knowledge on how the relationships between macro-clusters and network object sets for each macro-cluster work with respect to its interaction and communication with other (e.g., "related") macro-clusters and/or network objects. The topology information 228 can be a model usable to analyze situations where a macro-cluster, a relationship between macro-clusters and/or network objects of a macro-cluster are not working correctly and to help identify why it they are not working correctly using topology information of a related macro-cluster or set of network objects of those macro-clusters.

Description of Processes

Referring now to FIG. 3, there is shown an operating environment/process 300 for discovering and mapping the relationships between macro-clusters over a selected period of time of the topology information of network objects for the selected executing application 114 of the computer communication network 100. The process 300 may be or describe an operating environment in which the system 102 can perform the discovering and mapping of the relationships between macro-clusters and the network object sets for each macro-cluster of a network object topology of a computer communication network. The process 300 may be performed by the system 102. The process 300 starts at 305 and can end at 370, but the process can also be cyclical as shown by the "yes" loop from 360 to 310, which provides discovering and mapping of topology information in a "continual automated" manner. The process 300 may be performed after selecting object 110*c* and/or application 114. It can be appreciated that the process 300 can be repeated to determine the topology information 228 and/or graphic representations 230 for selected objects or applications, other than selected object 110*c* and/or application 114. For example, during the period of time or another period of time, another one of collector 210 can be used by object 120 to perform the process 300 to discover and map topology information 228 and/or graphic representations 230 for the relationship 186 between macro-clusters 150 and 160; and the network object sets for each of macro-clusters 150 and 160 using the objects 110*c*, 110*e* and 110*f*.

After 305 where process 300 starts, the process continues to 308 where a remote network object is selected that has a type of relationship with a first macro-cluster that has a type of relationship with a second macro-cluster of a network. Selecting at 308 may be selecting a remote network object 110*c* that has a type of relationship with macro-cluster 150 of the network 100 that includes a set of the network objects 110*b* and 110*d*. The network 100 includes macro-cluster 160 that includes a set of the network objects 110*h* and 110*i*. Each set of network objects of a macro-cluster can be a plurality; two or more; between 2 and 1000; or between 3 and 100 network objects. Macro-cluster 150 has a type of relationship and/or is communicating with the second macro-cluster 160, such as by object 110*b* having a type of relationship and/or communicating with the object 110*i*.

Selecting the remote network object at 308 may be performed automatically by the scheduler 219; or manually by a user at input 174. Selecting at 308 may be selecting application 114 as an application, a cluster, and/or a network object that it is believed has a relationship with or will provide configuration and time data 217 to show network topology information desired to discover the network topology or topology information of related macro-clusters 150 and 160. Selecting at 308 may be selecting application 114 that is known to have at least one relationship with another network object from which configuration and time data 217 can be gathered that will provide topology information 228 for relationship 186 between macro-clusters 150 and 160; and for the network objects of macro-clusters 150 and 160.

Selecting at 308 may include selecting a period of time for determining a network topology of an application executing on a network. This is selecting the "selected" period of time noted above and increases computer efficiency because there is a gap in time between such selected periods of time (e.g., see at 360) during which the topology does not need to be determined.

Selecting the period of time at 308 may be performed automatically by the scheduler 219; or manually by a user at input 174. Selecting at 308 may include selecting the period of time, the subsequent period of time, and a time between an end of the period of time and a beginning of the subsequent period of time at noted at 360. This selecting a period of time may be used by the collector 120 to program or control the sources 211-216 to collect the information 217 only during the period of time and/or subsequent periods of time.

After 308, at 310 a portion may be selected of a set of data messages being sent during or over the selected period of time of 308 by a selected application 114 executing on a selected network object of a plurality of network objects of the network 100. Selecting at 310 may be selecting a portion of a set of data messages being sent and being received during the selected period of time of 308 by a selected application 114.

In some cases, selecting the portion at 310 includes selecting between 2 and 10 percent of the set of data messages of the selected software application 114. In other cases, selecting the portion at 310 includes selecting between 5 and 25 percent of the set of data messages. Selecting at 310 may be selecting a portion of a set of data messages being sent or that have been sent over the period of time by the application 114. This selecting may be performed by collector 210 and may be used by the collector 120 to program or control sources 211-216 to collect the information 217 only for the selected portion of the set of data messages.

Selecting a portion at 310 may include the collector 210 parsing the set of data messages based on at least one statistical analysis that identifies trends in data message flow direction and convergence between the application 114 and the other network objects; then selecting the portion of the set of data messages based on the trends. The statistics may include statistics about flow records that are similar, count, average and sum the number of packets and bytes.

Selecting a portion at 310 increases computer efficiency because it avoids reading all the logs 244 of the set of messages by sources 211-216 or into the collector 210. Reading all of the logs may create an undesirable network load in or at application 114, the network object 110c and/or a virtual private cloud (VPC) and/or network of that application or object. In addition, selecting a portion may avoid sending all the logs 244 or raw data for or all of the logs 244 from the collector 210 to the network object 130. Sending all the logs or raw data can be redundant and potentially overload the entire system 102. This overloading may overload both of the network objects 120 and 130 with data transmissions thus slowing or stopping processing or performance.

In some cases, in addition to selecting a portion of the set of messages for the application 114, selecting at 310 also includes selecting another portion of another set of data messages being sent and/or received during the selected period of time by a related application and/or network object. For example, selecting 310 could include also selecting portions of the sets of data messages sent and received by the related application 116 and/or the related network object 110f, similar to the selecting a portion of the set of messages sent by the application 114.

After 310, at 315 flow log data from communication flow logs, metric data and configuration data of the selected network object 110c are gathered (or collected) using at least one flow log source, at least one metric data source and at least one configuration source, respectively. In some cases, gathering at 315 may be gathering the flow log data from communication flow logs, metric data and configuration data from objects 110c, 110e and 110f using the sources.

Gathering at 315 may be gathering flow log data from communication flow logs, metric data and configuration data from the period of time and portion of data messages from 308-310. The network object 120 may perform this gathering (e.g., collecting). Specifically, this collecting may be performed by the sources 211-216 reading or receiving source information from the executing application 114 and/or the selected object 110c. Collecting at 320 may also include the sources 211-216 reading the communication flow logs (e.g., the flow logs 244) of the selected network object 110c, where each flow log is associated with a data message received or transmitted by the selected executing application 114. Reading by the sources 211-216 may be controlled by the collector 210. For example, the controller 210 may cause sources 211-216 to only read the data at 315 for the portion of messages selected at 310; and to only read information 217 during the period of time selected at 308, and optionally during one or more subsequent periods of time (e.g., see at 360).

After 315 at 320 network configuration information and time data is generated (or detected) for the network objects of and relationship 186 between the macro-clusters 150 and 160 using the flow log data, metric data and configuration data from gathering at 315. Generating the network configuration information and time data at 320 includes generating that data for at least the macro-clusters 150 and 160; and/or at least the network objects 110b, 110d, 110h and 110i using the flow log data, metric data and configuration data from gathering at 315. Generating at 320 may include generating the network configuration information and time data for relationships 182 and 184. In some cases, at 320 the network CTD and TS information 217 is generated from the period of time and portion of data messages from 308-315.

For example, based on the data read from the flow logs 244, the executing application 114 and/or the selected object 110c, the configuration source 216 may detect the configuration information part of some of the CTD part the information 217 of the macro-clusters 150 and 160, and relationship 186. Next, based on the data read from the flow logs 244, the executing application 114 and/or the selected object 110c, the flow logs source 213 may detect the flow logs information of some of the CTD part of the information 217 of the macro-clusters 150 and 160, and relationship 186. Also, based on the data read from the flow logs 244, the executing application 114 and/or the selected object 110c, the metrics sources 211 and 212 may detect the metrics information of the TS part of the information 217 of the macro-clusters 150 and 160, and relationship 186. In some cases, being based on the data read from the executing application 114 and/or the selected object 110c, includes being also based on the data from objects 110e and 110f.

From the network CTD and TS information 217 generated at 320 it is possible to determine the network topology information (e.g., see at 330) of the network object 110b, topology information of the network object 110d, that the network object 110b has a relationship 182 with the network object 110d, topology information of the macro-cluster 150 (such as the type of macro-cluster that cluster 150 is; and that the network objects 110b and 110d are part of the macro-cluster 150), topology information of the network object 110h, topology information of the network object 110i, that the network object 110h has a relationship 184 with the network object 110i, topology information of the macro-cluster 160 (such as the type of macro-cluster that cluster 160 is; that the network objects 110h and 110i are part of the macro-cluster 160); and that the macro-cluster 150 has a relationship 186 with the macro-cluster 160. From the CT and TS information 217 it is also possible to determine the types of relationships of each of relationships 182, 184 and 186.

In some instances, to gather at 315, generate at 320 and/or determine topology information 228 at 330, only the network object 120 is collecting the information 217 from the network 100, thus, the object 120 is collecting the information 217 in an "agent-less" fashion. As compared to an agent-based collection, this agent-less fashion increases computer efficiency because it avoids having a collecting agent or collection resource located on each network object, resource or host of the network 100.

When gathering at 315, the API sources 211-216 may use a remote access source such as remote desktop services to access the selected network object 110c and read data from the application 114 and the communication flow logs 244. Using remote desktop services increases computer efficiency because it allows the object 120 to access the application 114 and the communication flow logs 244 (e.g., access object 110c) using low level permissions as compared to a collection using mid or high-level permissions. In some instances, the object 120 access to the application 114 only requires a low level of permissions and avoids needing administrator or root level permissions to the minimum amount required to collect information 217. The API sources 211-216 may use one or more remote access sources to access network objects 110e and 110f, similar to using a remote access source to access object 110c.

Each flow log of the logs 244 may include data in all or at least the first 8 of the following fields: version, account-id, interface-id, srcaddr, dstaddr, srcport, dstport, protocol, packets, bytes, start, end, action, log-status. Here, any of the sources 211-216, the collector 210, the processor 224 and/or the processor 226 (e.g., see at 330) can use the data in srcaddr, srcport and dstaddr, dstport to determine the information 217 or the topology information 228 including to determine the source network object (e.g., source IP address), target network object (e.g., target IP address) and possibly type of communication of the communication message of that log. The source network object (e.g., source IP address) and target network object (e.g., target IP address) may be determine when IP addresses that show up in the flow log (srcaddr, dstaddr) are both familiar. The type of communication may be determined based on the ports used by that communication identified in the log, because different applications traditionally use specific ports (for e.g. MySQL™ is using port 3306 by default). Collecting and using the information 217 from the flow logs 244 increases computer efficiency because it allows the sources 211-216 to determine the topology information 228 for the information 217 collected from a single application 217.

In some cases, the flow logs 244 read by the flow logs source 213 only identify a source network object IP address and a target network object IP address for some of the data messages. This may happen when the flow logs 244 are read from a flow log service of a cloud configuration. For these messages, the identified IP addresses identified by the source 214 can be sent by the controller 210 to the object 130 in the information 217. However, this leaves a portion of the data messages for which the flow logs 244 read by the flow logs source 213 do not identify any or all of a source network object IP address or a target network object IP address. For this portion of messages, the configuration source 216 can obtain and/or the processor 226 can determine (e.g., see at 330) the IP addresses of the source and/or target network objects based on the type of the network object that the source 216 detects in the configuration information it reads from those objects. Here, the IP addresses identified and/or configuration information for determining those addresses can be sent by the controller 210 in the configuration part of information 217. Using the configuration source 216 to determine the IP addresses that were not determined by the flow logs source 213 increases computer efficiency because it provides the source and/or target network object IP addresses that would otherwise not be available.

Each of the flow logs of logs 246 may include similar data fields as, be accessed similarly as, and/or be read similarly as flow logs of logs 244.

In some cases, generating at 320 includes the collector 210 sending the connectivity processor 226 the network CTD part of information 217 which includes or can be used to identifying unique keys of the network objects, IP addresses of the network objects, types of objects of the network objects, types of relationships between pairs of the network objects, groups of the network objects and time dimension data for the network objects in the topology for the executing application 114 during the selected period of time. The collector 210 may also send the time series processor 224 the TS part of information 217 which includes or can be used to identify timeseries data for the network objects in the topology for the executing application 114 during the selected period of time.

In some cases, generating at 320 includes the network object 120 transmitting or sending to the network object 130, only a portion of the information 217 collected from the portion of data messages. In some instances, the sources 211-216 read the information 217 from the communication flow logs 244 and send that information to the collector 210. The collector 210 then time stamps the read information 217. It also creates statistics about the time stamped information 217. The statistics may include statistics about flow records that are similar, count, average and sum the number of packets and bytes. In some cases, the collector 210 can create, maintain or store statistics about flow records of the logs 244 that are similar (srcaddr, srcport and dstaddr, dstport), count, average and sum the number of packets and bytes to reduce what is stored at the object 120, or sent by the object 120 in the information 217 to the object 130. This allows for a highly efficient, and yet simple way of filtering the flow logs sent by the collector 210, which increases computer efficiency because it reduces the amount of data sent to the object 130.

For example, based on the statistics, the collector 210 can filter the time stamped information 217 to remove redundant information; and then transmit the filtered information 217 to the network object 130. The collector 210 may send the connectivity processor 226 the filtered network CTD information for the executing application 114 during the selected period of time. The collector 210 may also send the time series processor 224 the filtered TS information for the executing application 114 during the selected period of time.

In some instances, during collection of the information 217 or determining of topology information 228, the only communication between the objects 120 and 130 is the one-way transmission of the information 217 from the object 120 to the object 130. By only communicating one-way, there are fewer restrictions and/or permissions required by the application 114 (or the object 110c) from the object 120 (e.g., for access to and collection of the information 217) because the information 217 is being communicated away from or is going outside of the application 114. This going outside case increases computer efficiency because the application 114 usually has a less restrictive firewall setting and requires less internal approvals from the object 120; as compared to if the object 120 is sending data to or writing to the application 114 or the object 110c.

In some cases, in addition to collecting a portion of the set of messages sent by the application 114, collecting at 320 also includes collecting the CTD and TS information 217 from other portions of data messages sent by a related application and/or network object. For example, collecting at 320 could include collecting CTD and TS parts of information 217 from portions (e.g., see selecting at 310) of the sets of data messages sent by the related application 116 and/or the related network object 110e, similar to the collecting a portion of the set of messages sent by the application 114 and/or the object 110c. Here, configuration source 216 collects the configuration information of the application 216 and/or the object 110e; and the metrics source C 214 collects the metrics information of the application 216 and/or the object 110e.

Also, collecting at 320 could include collecting CTD and TS information 217 from portions (e.g., see selecting at 310) of the sets of data messages sent by a related application by (or through) and/or by the related network object 110f, similar to the collecting a portion of the set of messages sent by the application 114 and/or the object 110c. Here, configuration source 216 collects the configuration information of the flow logs 246 and/or the object 110f; and the flow logs source 215 may also collect the flow logs information of the flow logs 246 and/or the object 110f.

After 320, at 330 the topology information 228 of the network objects of each of the macro-clusters 150 and 160; and the relationship 186 between the macro-clusters 150 and 160 are determined. Determining at 330 may also include determining the topology information 228 for other network objects related to application 114. In some cases, determining at 330 is determining the topology information 228 of at least the network objects of the macro-clusters 150 and 160; and the relationship between the macro-clusters 150 and 160. Determining at 330 may include determining the topology over the period of time at 308 and portion of data at 310 based on the collected CTD and TS information 217 determined and sent at 320. This determining may include continual and automated discovering and parsing over time of the topology of the macro-clusters 150 and 160; and the relationship between the macro-clusters 150 and 160. Determining at 330 may be performed by the connectivity processor 226 processing the network CTD part of the information 217 sent by the collector 210 to create the connectivity part of the information 228 and/or by the time series processor 224 processing the TS part of the information 217 sent by the collector 210 to create the timeseries part of the information 228.

Determining the topology information 228 of macro-clusters 150 and 160; and the relationship between those macro-clusters 150 and 160 at 330 may include determining the network topology information of the network object 110b, network topology information of the network object 110d, that the network object 110b has a relationship 182 with the network object 110d, network topology information of the macro-cluster 150 (such as the type of macro-cluster that cluster 150 is; and that the network objects 110b and 110d are part of the macro-cluster 150), network topology information of the network object 110h, network topology information of the network object 110i, that the network object 110h has a relationship 184 with the network object 110i, network topology information of the macro-cluster 160 (such as the type of macro-cluster that cluster 160 is; that the network objects 110h and 110i are part of the macro-cluster 160); and that the macro-cluster 150 has a relationship 186 with the macro-cluster 160. It may also include determining the types of relationships of each of relationships 182, 184 and 186.

For example, the connectivity processor 226 determines from the received CTD part of the information 217, the connectivity part of the information 228 which may include the unique keys of the network objects, the types of objects of the network objects, the types of relationships between pairs of the network objects, the groupings of the network objects and time dimension data for the macro-clusters 150 and 160; and the relationship 186 between those macro-clusters. The time dimension data may show changes over time in the connectivity part of the information 228, such as changes in the existence of, types of objects of, types of relationships between pairs of, and groupings of the macro-clusters 150 and 160; and the relationship 186 between those macro-clusters during the period of time. It is considered that in certain cases, the TS part of the information 217 may also be processed by the processor 226 to determine or create the connectivity part of the topology information 228.

Also, the time series processor 224 determines from the received TS part of the information 217, the timeseries (e.g., metrics) part of the information 228 for the macro-clusters 150 and 160; and the relationship 186 between those macro-clusters. The timeseries data may show the and/or show changes over time in the timeseries part of the information 228, such as changes in the performance metrics of the macro-clusters 150 and 160; and the relationship 186 between those macro-clusters during the period of time. It is considered that in certain cases, the CTD part of the information 217 may also be processed by the processor 224 to determine or create the timeseries part of the topology information 228.

The determined topology information 228 at 330 can be stored in the data store 222 as noted at 340 and/or displayed in a graph representation as noted at 350.

In some cases, determining the topology information 228 at 330 also includes the connectivity processor 226 sending the processed connectivity part of information 228 (e.g., what the processor 226 determines from the received CTD part of the information 217) to the data store 222; and receiving from that store 222 current and/or prior determined connectivity information (e.g., a stored model of a prior connectivity part of the topology for the macro-clusters 150 and 160; and the relationship 186 between those macro-clusters at a prior point in time). The connectivity processor 226 then determines the connectivity part of the information 228 using the configuration part of the information 217 received from the collector 120 and the prior connectivity information part of topology information 228 received from the store 222. Similarly, determining the topology information 228 at 330 may also include the time series processor 224 sending the processed timeseries part of information 228 (e.g., what the processor 224 determines from the received TS part of the information 217) to the data store 222 and receiving from that store 222 current and/or prior determined timeseries information (e.g., stored timeseries data for a prior topology for the macro-clusters 150 and 160; and the relationship 186 between those macro-clusters at a prior point in time). The time series processor 224 then determines the timeseries part of the information 228 using the time series part of the information 217 received from the collector 120 and the prior timeseries information part of topology information 228 received from the store 222. Receiving the information from the store 222 increases computer efficiency because it allows the processors 224 and 266 to compare and identify differences over time between recently received versions of the information 217 and the stored prior information 228 received from the store 222. In some instances, determining at 330 may include determining the topology information 228 of an average network with 200 hosts (e.g., network objects) within 15 minutes at an accuracy of 70% and within additional 45 min (total 60 min from start) at an accuracy of 95%, meaning that 95% of the connections between network objects of the topology of the executing application will be discovered.

Figure 4:
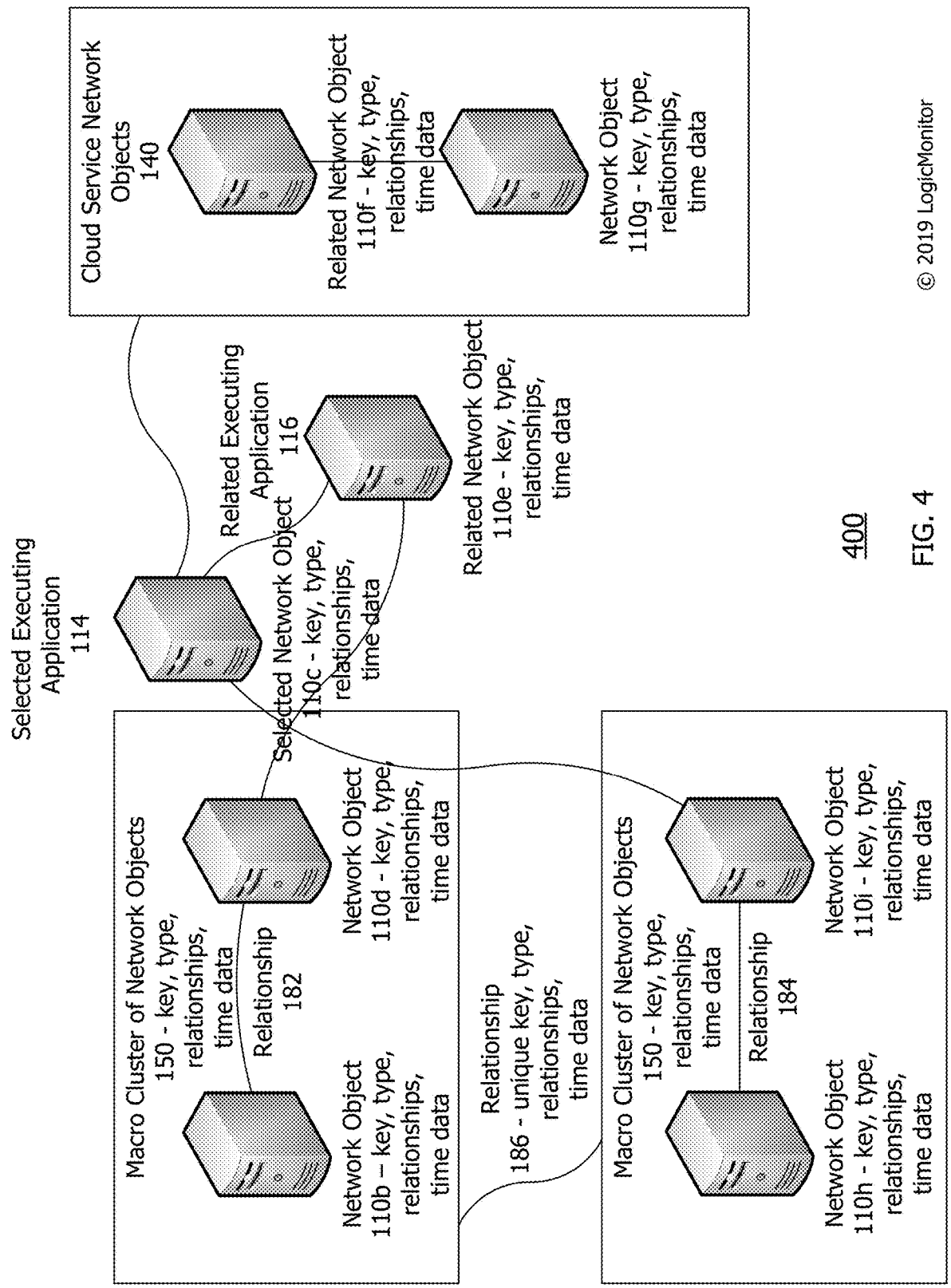
FIG. 4 shows a graph representation of the relationships between macro-clusters of topology information of the computer network for the selected application for a period of time.

Determining the topology information 228 at 330 may include determining the physical network objects, virtual network objects, software applications and/or hardware of the macro-clusters 150 and 160; and the relationship 186 and may also include determining them for each network object that the macro-clusters 150 and 160; and the relationship 186 are related to or communicating with. In some cases, at least network objects 110c, 110e and 110f are related to macro-clusters 150 and 160; and the relationship 186 as noted above. For example, the topology information 228 may be for the macro-clusters 150 and 160; and the relationship 186 and show the selected application 114 and/or network objects 110c, 110e and 110f communicating with or having a relationship with the macro-clusters 150 and 160; and the relationship 186, such as shown in FIG. 4.

The determined topology information 228 may be unique keys of the network objects, types of objects of the network objects, types of relationships between pairs of the network objects, groupings of the network objects, time dimension data for each of the macro-clusters 150 and 160; and the relationship 186 (e.g., the connectivity part of the information 228), and optionally timeseries data (e.g., metrics data or the timeseries part of the information 228) of any network objects that are discovered or determined to be part of the topology information 228 of the network 100 for the macro-clusters 150 and 160; and the relationship 186 during the period of time.

The unique key of a network object may be one (a single) key that uniquely identifies each network object from the other network objects, the macro-clusters and the relationships of the topology. The unique key of a macro-cluster may be one (a single) key that uniquely identifies each macro-cluster from the others, the relationships and the network objects. A unique key may also be a key that uniquely identifies a relationship between macro-clusters such as relationship 186 from any other relationship, any network object and any macro-cluster. Each key may be determined or selected by the connectivity processor 226 from or based on the configuration part of the information 217 received from the collector 210 and of the topology information 228 received from the store 222 by the connectivity processor 226. In some cases, every network object of the topology information 228 has at least one unique key and may possibly have multiple "keys" that are completely unique. A unique key cannot be repeated or reused within a single network object or macro-cluster; and cannot be used in or for more than one network object or macro-cluster of the topology information 228 (e.g., because that would lead to these two objects or clusters to be merged into a single object or cluster).

As information 217 is collected for the network objects and/or macro-clusters, each object and/or macro-cluster is given unique key by processor 226 on a case by case basis. The unique keys are derived by the processor 226 per specific network object and/or macro-cluster from what of the topology information 228 can represent this object in a unique way, within the specific technology domain of the network 100. Every new object, macro-cluster and/or technology that is added to the topology requires the processor to make a decision about what key (or set of keys) should be used for this situation, object and/or cluster. In some cases, if it is available, the key is a fully qualified name (FQN) of a server. In cloud systems (e.g., cloud objects 140), usually the cloud provider has or provides specific keys that represents each object which can be used as a unique key. For example, AWS (Amazon Cloud™) has a set of internal unique keys (e.g., ARN—Amazon-Resource-Name) per each network object of a network that the processor 226 can use as the unique keys. Similar sets of keys from other cloud providers such as Microsoft Cloud™ or Google Cloud™ can be used. In a different domain, such on-premise the processor 226 can use logical media access control (MAC) addresses and/or physical MAC addresses from networking or other identification keys from technologies such as VMWare™ or other virtualization and cloud computing software. In some cases, a fully qualified uniform resource locator (URL) may be used. It can be appreciated that a mixture of the above noted keys, or other data of information 217 can be selected or used to create the unique key for each of the network objects and/or macro-clusters of topology information 228.

A macro-cluster unique key given by object 130 may be based on a unique key of one of the network objects of that cluster, a number of the network objects of that cluster or another process. For example, even though the macro-cluster may be a number of network objects working together to perform a service, there may not be a physical network object that represents the entire macro-cluster to get a key from. The key of each macro-cluster can be determined using a process that considers the key of one or more of the objects of that cluster. Here, in one case, that macro-cluster's key can be derived from one or more of the network objects of that macro-cluster, such as by adding a character to one of the object keys; sorting the keys of all that cluster's objects and appending them to make a big key, or hashing them to invent a key. Here, in another case, that macro-cluster's key can be determined by another process such as by looking a key up from a look up table or list. The key for each cluster can be a list of the keys of all of the objects that cluster. The list may be sorted in one of various ways, such as by lexicographically, alphabetically and/or numerically. In some cases, the key of all the macro clusters is determined using the same process and so that no two macro clusters have the same key.

A type of object of a network object may be a type of physical network object and/or a type of virtual network object as noted herein.

A type of macro-cluster of a macro-cluster may be a type of physical macro-cluster and/or a type of virtual macro-cluster. A type of macro-cluster given by object 130 may be based on a type of object of one of the network objects of that cluster, a number of the network objects of that cluster or another process. This may be similar to determining the unique key of the macro-cluster as noted above, but instead for the type of object of the macro-cluster.

The type of macro-cluster for each cluster can be a list of the types of objects of all of the objects that cluster. The list may be sorted in one of various ways, such as by lexicographically, alphabetically and/or numerically. The type of macro-cluster for each cluster can be based on the goal of the cluster, software of the cluster or an application that the cluster implements. For instance, the type may be a similar goal that two or more network objects of the cluster are working towards. In some cases, the type of macro-cluster of all the macro clusters is determined using the same process and any of the macro clusters may be the same type.

A type of relationship between network objects may broadly be a network relationship, a data relationship, a functional relationship between pairs of the network objects. In some cases, a type of relationship between pairs of the network objects may be a network object controlling actions performed by another network object, a network object communication with another network object, a network object depending on another network object in order to operate correctly, and/or a network object streaming data to another network object.

A type of relationship between macro-clusters may broadly be a network relationship, a data relationship, a functional relationship between pairs of the macro-clusters. In some cases, a type of relationship between pairs of the macro-clusters may be a macro-cluster controlling actions performed by another macro-cluster; a macro-cluster communication with another macro-cluster, a macro-cluster depending on another macro-cluster in order to operate correctly, and/or a macro-cluster streaming data to another macro-cluster. A type of relationship between macro-clusters may also be or include a type of relationship between network objects. A type of relationship between macro-clusters given by object 130 may be based on a type of relationship between a network object of one of the clusters and a network objects of the other cluster, the type of relationship between a number of the network objects of the two clusters, or another process. This may be similar to determining the unique key of the macro-cluster as noted above, but instead for the type of relationship between the macro-cluster.

The relationship and type of relationship between macro-clusters may be between a logical abstraction one level up from the objects of macro-cluster and/or between the unique keys for the macro-clusters. The type of relationship between macro-clusters may be a list of the types for each relationship between the objects of the two clusters. The list may be sorted in one of various ways, such as by lexicographically, alphabetically and/or numerically. The type of relationship between macro-clusters can be based on the goal of the two clusters, software of the two clusters and/or an application that the two cluster implement. For instance, the type of relationship may be a similar goal that two or more network objects of the one of the clusters are working towards appended with a similar goal that two or more network objects of the second of the clusters are working towards. In some cases, the type of relationship between all related macro clusters is determined using the same process and any of the types may be the same type.

However, these examples of relationships are not limiting. Any type of relationship between network objects and/or macro-clusters can be expressed including relationships that are newly discovered by the processor 226 and were not previously programmed into that processor.

Time dimension data for a network object may be data that describes changes of that object over time. In some cases, the time dimension data may describe the occurrence and timing of the addition, existence and departure of network objects from the topology information 228 over the period of time.

Time dimension data for a macro-cluster or relationship between macro-clusters may be data that describes changes of that macro-cluster or relationship over time. In some cases, the time dimension data may describe the occurrence and timing of the addition, existence and departure of macro-clusters or relationships from the topology information 228 over the period of time. The time dimension data for a macro-cluster may be based on a time dimension data of one network object of that cluster, a number of the network objects of that cluster or another process. This may be similar to determining the unique key of the macro-cluster as noted above, but instead for the type of object of the macro-cluster.

The time dimension data for each macro-cluster may be the time dimension data for a logical abstraction one level up from the objects of macro-cluster and/or for the unique key for that macro-cluster. The time dimension data of a macro-cluster can be based on or an aggregate of the time dimension data for each of the objects of that macro-cluster. For example, the time dimension performance of the cluster may have a minimum based on the worst performing object and a maximum based on the best performing object of that cluster. The time dimension data for a macro-cluster may be that of a combination of or for a list of all of the objects of that cluster. The list may be sorted in one of various ways, such as by lexicographically, alphabetically and/or numerically. The time dimension data of a macro-cluster can be based on the goal of the cluster, software of the cluster and/or an application that the cluster implements. For instance, the time dimension data may be that of a similar goal that two or more network objects of the cluster are working towards. In some cases, the time dimension data of all of the macro clusters is determined using the same process and any of the that data may be the same for any two clusters.

These descriptions can be determined using or based on the CTD and/or TS part of the information 217.

For example, the CTD part may be used by the processor 266 to determine time dimension data including the existence and properties of the macro-clusters and relationship between those macro-clusters over the time period. This may include the processor 226 and/or data store 222 keeping topology information 228 over the period of time that includes time related notes of the events of when a macro-cluster and/or relationship between macro-clusters was created or stopped existing as well as when certain properties of that macro-cluster and/or relationship between macro-clusters changed. This part of the information 217 can be queried by a user, within a required time range or the period of time. This may also include the processor 226 and/or data store 222 keeping topology information 228 that includes time related notes of when relationships between pairs of macro-clusters and relationship between those macro-clusters began, changed and ended. These relationship notes can all be kept with a timestamp with relation to the macro-clusters and relationship between those macro-clusters so this part of the topology information 228 can be later queried by a user, within a time range.

In some cases, the timeseries part of topology information 228 for a macro-cluster and/or relationship between macro-clusters may be data that describes changes in metrics over time for that macro-cluster and relationship in the topology information 228. For example, the TS part of the information 217 may be used by the processor 224 to determine time-series part of the information 228 including the different metrics signals of the macro-clusters and relationship between those macro-clusters over the time period. This may include the time series processor 224 and/or data store 222 keeping topology information 228 that includes time related notes of the timeseries data of measured signals (e.g., collected at 320) that relate to each macro-cluster and/or relationship between macro-clusters. The timeseries notes of the timeseries part of the information 228 are obviously related to a time and this part of the information 228 can be queried by a user, based on a time interval.

As part of determining the topology information 228 at 330, the network object 130 or the processor 226 may maintain a list of IP addresses and/or unique keys of the macro-clusters and relationship between those macro-clusters received in the information 217; and determine if one of these IP addresses and/or unique keys changes over time based on comparing the IP address and/or unique key of that macro-cluster and/or relationship in the list with subsequently IP addresses and/or unique keys for that macro-cluster and/or relationship received in the information 217. Determining the topology information 228 at 330 can include comparing this list over time to determine IP address and/or unique key changes of the macro-clusters, types of relationship changes between pairs of the macro-clusters, time dimension data and timeseries data for the macro-clusters and/or relationships during the period of time. Using this list and comparison increases computer efficiency because it more accurately determines the topology information 228 for macro-clusters and/or relationships that having changing IP addresses and/or unique keys, such as cloud services that rotate IPs periodically; and helps the sources 211-218 create a continuous stable connectivity with the macro-clusters and/or relationships.

In some cases, part of determining the topology information 228 at 330 includes determining the types of macro-clusters and/or the types of relationships between pairs of the macro-clusters based on grouping of multiple network objects and/or metrics determined for the network objects. In some cases, part of determining the topology information 228 at 330 includes automatically grouping network objects having a common function into cluster subsets and service subsets by creating a number of abstraction layers by interpreting low level relations between pairs of the network objects and collapsing functional groups of the network objects into higher level macro-clusters (e.g., macro cluster 150).

For example, this automatically grouping may include automatically detecting and segmenting macro-clusters: functional groups such as a micro-service (from that micro-service's low level communication and configuration dependencies) and allowing a grouping of set of resources with a common function (such as a cluster, a scaling group, a micro-service, and the like), and allowing a collapsed and/or expanded view (from an API perspective of the sources 211-216) of these functional groups. In some cases, part of determining the topology information 228 at 330 includes semi-automatically grouping such as when the automatic grouping is confirmed or activated by a user or system administrator of system 102. Creating the groupings, macro-clusters, collapsed views and/or expanded views at 330 increases computer efficiency because they can also be used by the object 130 to determine the types of network objects and/or the types of relationships between pairs of the network objects during the period of time.

Determining and/or mapping the topology information (e.g., of the network objects grouped as) macro-clusters and relationship between macro-clusters at 330 may be described as looking at parts of topology information 228 from a level up or above that of the network object only view. It is looking at the topology from a level of abstraction that is moved up to determine and/or map any group (e.g., macro-cluster) of network objects that are doing work towards (e.g., performing actions to achieve) a similar goal and/or expose other network objects (e.g. to the outside of the group) an interface for accessing a combined output of the group. After the groups are determined, the relationships between macro-clusters can be determined and/or mapped.

A macro-cluster may be detected or mapped by determining that the topology information 228 includes a set of network objects having a certain or predetermined topology shape and/or set of relationships. Here, a group of network objects and/or of relationships between multiple network objects can be automatically grouped into a macro-cluster by the system 102 and/or at 330. For example, when more than a predetermined threshold number of objects having a predetermined number or type of relationships between them exist in the network, they may form a macro-cluster.

For example, if the topology information includes two or more network objects communicating with an entry point object that have a relationship with two or more other network objects, the two or more network objects and entry point object may be determined to be a macro-cluster.

A macro-cluster may be detected when a single entry point that receives a communication or data request via a relationship with an object not in the cluster, delegates the communication to one of multiple the internal objects of the macro-cluster (e.g., creates communication/relationship between the requestor and the delegated to object). The entry point may delegate the communication to more than one object.

The single entry point may be a point from which communication gets split or distributed to other objects of the cluster, thus forming the macro-cluster. In one case, a macro-cluster is detected when a load balancer type network object is performing balancing of the communications load between other network objects of the macro-cluster. For one example, a macro-cluster is detected when all the requests/communications received from outside the cluster by the entry point balancer network object are distributed in a round-robin pattern between all the other network objects of the macro-cluster. For another example, a macro-cluster is detected when all the requests/communications received from outside the cluster by the entry point are symmetrically distributed to all resource type network objects of the cluster in a spoked or spiral pattern.

If the two or more other network objects that have a relationship with the entry point object are part of another macro-cluster, that relationship may be detected or mapped as the relationship between the two macro clusters or upon which a relationship between the two macro clusters is based.

In another example, if the topology information includes between three and a hundred network objects communicating with a single entry point or load balancing object that has a relationship with between five and a million other network objects, the between three and a hundred network objects and entry point object may be determined to be a macro-cluster. In some cases, if the five and a million other network objects that have a relationship with the entry point object are part of another macro-cluster, that relationship may be the relationship between the two macro clusters or upon which a relationship between the two macro clusters is based.

Other examples of relationships between macro-clusters include all of or subset number of objects of a macro-cluster are communicating with an entry point object of another cluster; only 1 object of a macro-cluster is communicating with any one object of the other cluster; and/or all objects of a cluster are (e.g., symmetrically) communicating with all objects of another cluster.

Two or more network objects that are doing work towards a similar goal may be determined and/or mapped as a macro-cluster. To determine and/or map as a macro-cluster may require at least 3, 5 or 10 objects doing work towards a similar goal.

Any one network object of one macro-cluster having a relationship with any one network object of another macro-cluster may be determined and/or mapped as a relationship between those macro-clusters. In other cases, to determine and/or map a relationship macro-clusters may require at least 3, 5 or 10 objects of one cluster having relationships with at least one object of the other cluster.

A threshold conditions or set of relationships for detecting that a cluster exists is detecting a load balancer and creating a cluster for the balancer and all objects having an immediate relationship with that balancer. A condition may be detecting two or more objects connected to a database object and creating a cluster for the database and all objects having an immediate relationship and/or connection to that database. A condition may be detecting a network object topological symmetry for three or more objects connected to each other and creating a cluster for those objects. The symmetry may be a general network object symmetry; may be a symmetry based on two or more of the objects performing the same or a similar function; may be a symmetry based on two or more of the objects being the same type of object; and/or be a symmetry based on the system knowing that three or more network objects are doing work (cooperating) towards a similar goal. A condition may be detecting a logical abstraction one level up from a set of the objects and creating a cluster of those objects. The system may discover new logical abstractions and conditions for detecting a macro-cluster during performance such as during determining at 330, storing at 340 and/or displaying at 350.

Also, the macro-cluster (e.g., predetermined topology shape and/or set of relationships) can be monitored or continually mapped over a period of time to detect a failure or performance degradation, such as when more than a predetermined threshold number of objects or relationships of the macro-cluster cease to exist or fail to exceed a metric performance level.

The threshold number of objects and/or relationships may be based on a level of performance for the cluster, relationship or communication thereof. They may be based on a minimum communication requirement for the clusters to be functioning correctly.

For example, they may require that two macro-clusters each have at least 10 objects; and that at least 10 objects of one macro-cluster have relationships with at least 10 objects of the other macro-cluster. In another case, they may require that there are any number of relationships between these macro-clusters.

If the number of objects and/or relationships fail to exist, the system 102 may issue a warning or identify that an issue exists, such as from business and/or network trouble shooting perspective.

As noted, the collected TS information 217 at 320 can include metrics data information for each macro-cluster and relationship between macro-clusters, which may be used to determine the timeseries part of the information 228. In some cases, part of determining the topology information 228 at 330 includes time series processor 224 processing the TS part to automatically determine metrics for each macro-cluster and relationship between macro-clusters of information 228. Thus, determining topology information 228 at 330 can include determining if critical metric data is missing for any of the macro-clusters and/or relationships between macro-clusters based on the metric data information.

For example, based on the groupings, macro-components, collapsed views, macro-clusters, relationship between macro-clusters and/or expanded views, the object 130 can determine what the critical metrics are for each macro-cluster and what are the rolled-up individual key performance indicators (KPI) to the macro-cluster level. Determining the critical metrics and KPI provides a critical capability to a user accessing or displaying a graph representation 230 of the topology information 228 by performing calculations at 330 that are ad-hoc and constantly changing based on the underlying changing resources and configurations of the determined metrics, groupings, macro-clusters, collapsed views and/or expanded views. For example, a macro-cluster that is a service may have the following rolled-up metrics: "Average CPU utilization", "Max CPU utilization", "95th percentile CPU utilization", representing the roll-up of CPU metrics at a time where the number of hosts is constantly changing over time. In one case, the macro-cluster 150 may have these rolled-up metrics that can be identified in the graph representation 230 while the network objects of macro-cluster 150 in the topology information 228 changes in number during the period of time. In some cases, this rolled up information will remain in the data store 222 as prior topology information 228, even after the network objects of macro-cluster 150 that were a part of the rolled up result no longer exist in the current topology information 228 (e.g., as they are of an ephemeral nature in clouds or containers). So. the rolled up data can be used as evidence in a troubleshooting process for the of macro-cluster 150 or relationship 186 even if some of the network objects of macro-cluster 150 at the time of a troubling issue are already gone from the current topology information 228. The determining of metrics data of network objects at 330 increases computer efficiency because the metrics data can also be used by the object 130 to determine the types of macro-cluster and/or the types of relationships between pairs of the macro-clusters during the period of time.

The critical metrics and/or KPI of a macro-cluster may be those for a logical abstraction one level up from the objects of macro-cluster and/or for the unique key for that macro-cluster. The critical metrics and/or KPI of a macro-cluster can be based on or an aggregate of the critical metrics and/or KPI data for each of the objects of that macro-cluster. For example, the critical metrics and/or KPI performance of the cluster may have a minimum based on the worst performing object and a maximum based on the best performing object of that cluster. The critical metrics and/or KPI data for a macro-cluster may be that of a combination of or for a list of all of the objects of that cluster. The list may be sorted in one of various ways, such as by lexicographically, alphabetically and/or numerically. The critical metrics and/or KPI data of a macro-cluster can be based on the goal of the cluster, software of the cluster and/or an application that the cluster implements. For instance, the critical metrics and/or KPI data of a cluster may be that of a similar goal that two or more network objects of the cluster are working towards. The critical metrics and/or KPI of a cluster may be an average of that of all of the objects of that cluster over a period of time. It may be based on the critical metrics and/or KPI data of only some of the objects of that cluster. for example, if a number of objects of the cluster perform a similar function, are redundant and/or a similar type, the data may be that for only a minimum number of those objects required to continue performing the goal of that cluster. In one example, if only 2 of 10 objects that serve webpages are needed to perform the goal of the cluster, then the data will be for a combination of any 2 or more of those objects that are functioning, even if the others are not functioning or are broken. If only 1 is functioning the data will show a fail of the cluster. Using an automobile analogy, the side view mirrors of a car may be broken but if the rearview mirror functions, the car may be driven legally. In another example, if some of the objects are not needed to perform the goal of the cluster, then the data will be for a combination of the objects that are needed for the goal, even if the other objects are not functioning. If the needed objects are not functioning the data will show a fail of the cluster. Using an automobile analogy, the blinkers and/or air conditioning of a car may be broken but if the other parts work, the car may be driven. In another example, if some of the objects are not needed to perform a different goal than the original or current goal of the cluster, the data can also be for a combination of the objects that are needed for the different goal, even if the other objects are not functioning and the data shows a fail of the cluster for the original goal. In this case, an administrator may consider switching the goal or use of that cluster to the different goal. Using an automobile analogy, a tire of the car may be broken, and the car may not be driven. However, this car may still be run and the air conditioning used to keep cool. The critical metrics and/or KPI of a cluster may be based on a mathematical process or calculation that has hysteresis. The critical metrics and/or KPI of a cluster may be based on a mathematical process or calculation that is linear or one that is non-linear. In some cases, the critical metrics and/or KPI data of all of the macro clusters is determined using the same process and any of the that data may be the same for any two clusters. The critical metrics and/or KPI of a cluster may be that of a load balancer, database object or network object topological symmetry of the cluster.

If the cluster, its network objects and/or a relationship between clusters fails a metrics threshold, the system 102 may issue a warning or identify that an issue exists, such as from business and/or network trouble shooting perspective.

After 330, at 340 the topology information 228 of the macro-cluster and relationship between macro-clusters over the period of time is stored. For example, at 340 the network object 130 may store the topology information 228 received from the processors 224 and 226 in data store 222. The data store 222 can be the storage 514 and/or the memory 512 of FIG. 5. This storing may include the data store 222 storing the processed portion of the collected network CTD information sent by the collector 210; and/or the processed portion of the collected TS information sent by the collector 210. The stored topology information 228 may be sent to the processors 224 and/or 226 as shown by the arrows in FIG. 2 for determining the topology information 228 during the current period of time or a subsequent period of time (e.g., see at 360 of FIG. 3). The stored topology information 228 may be used for displaying a graph representation 230 of the topology information (e.g., also see FIG. 4) of macro-clusters 150 and 160; and relationship 186 between those macro-clusters. In some cases, storing at 340 is not performed and the process skips to displaying at 350.

After 340, at 350 a graph representation 230 of the topology information 228 of the macro-cluster and relationship between macro-clusters over the period of time may be created and/or displayed. The user input/output (I/O) device 170 may be used to select creating and/or displaying one or more of graph representation 230 of macro-cluster and relationship between macro-clusters at 350. This selection may cause the data store 222 and/or the I/O device to access the topology information 228 stored in data store 222 and create a graph representation 230 of some or all of that topology information 228 of macro-cluster and relationship between macro-clusters for one or more points in time during the time period. The selection may also cause the data store 222 and/or the I/O device to display the created graph representation 230 on the display 172.

For example, at 350 a graph representation 230 of the topology information 228 for the macro-clusters 150 and 160, and relationship 186 which are related to the selected application 114 for the period of time may be displayed on the display 172 (e.g., see FIG. 4). Creating and/or displaying the graph representation 230 increases computer efficiency because it shows a representation of each macro-cluster and relationship between macro-clusters; the unique key of each macro-cluster and relationship between macro-clusters, the types of object of each network object, the groupings of the network objects, the types of relationships between each pair of the macro-clusters, and time data of the macro-clusters and relationships between macro-clusters in the topology information 228. Here, the "time data" is the time dimension data (e.g., of the connectivity part of the information 228) and optionally, also the timeseries data (e.g., timeseries part of the information 228) of the macro-clusters and relationships between macro-clusters in the topology information 228. The graph representation 230 may be a two-dimensional or three-dimensional view of the requested part of the topology information 228 that includes a map or graph, or topology interconnection display having: a representation of, unique keys of, type of object of, types of relationships between pairs of, groupings of, and time data of each macro-cluster and relationship between macro-clusters that satisfies the graph representation of topology information 228 requested by the user.

The representation of each object may be an image, symbol, text and/or another indicator that distinctly identifies each macro-cluster and relationship between macro-clusters. For example, FIG. 4 shows the objects as a desktop computer, server computer symbol or box containing a number of those objects, but those symbols are only representations as a macro-cluster or relationships between macro-clusters may actually be any of various types of object or shape. The type of macro-cluster and the types of relationships between each pair of the macro-clusters may be as noted herein. The time data for each macro-cluster and relationship between macro-clusters may be used to show changes in the graph representation 230 and in performance of the macro-clusters and relationship between macro-clusters in that representation over time.

For example, creating and/or displaying at 350 may also show changes in the graph representation 230 of the representation of each macro-clusters and relationship between macro-clusters over the period of time. These changes may be based on the changes in time data (e.g., time dimension data and optionally timeseries data) of the topology information 228. Creating and/or displaying the changes in graph representation 230 increases computer efficiency because it allows the user to more easily identify and track changes of macro-clusters and relationship between macro-clusters over time in the topology information 228.

In some cases, the graph representation 230 may be a periodic sequential series over time of the graph representations of macro-clusters and relationship between macro-clusters of the topology information 228 during part or all of the period of time. In some cases, the graph representation 230 may be one or more non-periodic series of the graph representations of the topology information of macro-clusters and relationship between macro-clusters at one or more points in time during the period of time. The user input 174 may be used to select displaying the periodic sequential series and/or non-periodic series of the graph representations of macro-clusters and relationship between macro-clusters of the topology information at one or more points in time during the period of time.

For example, the display 172 or the input 174 may display a time bar having a range from the beginning to the end of the period of time and a slidable location indicator on the time bar that can be located along the period of time by the input 174 (e.g., manipulated by sliding or clicking using a keyboard or mouse) to select displaying the graph representation 230 of macro-clusters and relationship between macro-clusters at/for points in time of the period of time selected using the indicator. The indicator may be slid forward or backward along the period of time to display the changes of macro-clusters and relationship between macro-clusters between a first point in time and a second point in time on the bar. The changes in the graph representation 230 may be shown with marks such as highlighting, shadowing, fading, lightening, darkening, bold, underline, italics and/or the like.

Determining the topology information of the macro clusters 150 and 160 and the relationship 186 between them at 330 may be mapping the topology information of the macro clusters 150 and 160 and mapping the relationship 186 between them. Determining the topology information of the macro clusters 150 and 160 and the relationship 186 between them at 330 and displaying a graphic representation of that topology information at 350 may be mapping the topology information of the macro clusters 150 and 160 and mapping the relationship 186 between them.

After 350, at decision block 360 it is decided whether process 300 (e.g., 308-360; or optionally only 315-340) will be repeated. If so, process 300 returns to 308 where process 300 repeats for a subsequent period of time.

Process 300 may return to 310, such as where after returning to 310, the period of time referred to in 310-350 is for a subsequent period of time. Here, the original or initial period of time may be referred to as a "first period of time." If process 300 will not be repeated at 360, process 300 ends at 370. In some cases, process 300 is repeated for between ten and thousands of subsequent periods of time after the remote network object is selected at 308. There may be a delay at 360 between the first period of time during which messages were selected at 310, and the subsequent period of time during which messages will be selected at 310 after 360. Deciding at 360 or causing repeating at 360 may be automatically performed by a scheduler 219 of the collector 210 or performed by a user at the input 174. Selecting the period of time, the subsequent period of time, and a time between an end of the period of time and a beginning of the subsequent period of time may also be automatically performed by the scheduler 219 or performed by a user at input 174.

In one case, the period of time is between 5 and 10 minutes, the subsequent period of time is between 5 and 10 minutes, and the subsequent period of time occurs after each end of a prior period of time, one of periodically having a period that is between 50 to 70 minutes, or randomly between 50 and 70 minutes after each end of a prior period of time. In another case, the period of time is between 2 and 5 minutes, the subsequent period of time is between 2 and 5 minutes, and the subsequent period of time occurs after each end of a prior period of time, one of periodically having a period that is between 10 to 20 minutes, or randomly between 10 and 20 minutes after each end of a prior period of time.

Repeating at 360 may be repeating selecting at 310, gathering at 315 and generating 320 for the at least one subsequent period of time. Repeating selecting, gathering and generating at 360 may cause or include repeating determining at 330 and storing at 340, for the at least one subsequent period of time.

After 360, and repeating 310-340, displaying the graph representation 230 at 350 may include displaying changes between topology information of macro-clusters and relationship between macro-clusters for the period of time and topology information for the subsequent period of time as noted at 360. Displaying the changes may include graphically identifying where changes in the graph representation 230 and/or the topology information 228 of macro-clusters and relationship between macro-clusters have occurred between the period of time and the subsequent period of time with marks as noted at 350.

The gathering, generating and creating of 315-330 may be performed for or over a first and then over a later second period of time to create the network topology information for or at the end of both periods. Based on these topologies, it can be detected if the relationship 186 between macro-clusters 150 and 160 exists; and/or if both of those macro-clusters exist during or at the end of the second period. If the relationship 186, macro-cluster 150 or macro-cluster 160 does not exists during or at the end of the second period, a network error message can be transmitted to a network warning system or a system administrator of system 102.

As an analogy, if you look at the parts of a car it breaks down to say 60,000 discrete elements, but when a person thinks about a car they do not think of the 60,000 individual parts. Instead they think of it as different sub-assemblies such as the wheels, engine, transmission, brakes, suspension, interior, seats, windows, audio, etc. and the way those interact with each other. Another analogy is identifying a city by grouping the roads and buildings having a certain density within an area. This higher level of abstraction is like looking down at the roads and buildings from 10,000 feet up in the air and realizing there are two towns and they are connected by a road (e.g., the relationship between them).

In the network setting, examples of macro-clusters are a group of servers that serve as micro service, macro-structure or macro-cluster, such as a micro service that does an Internet search for terms entered by a user or a micro service that finds prices of homes at addresses/locations entered by a user.

Examples of the relationships between the macro-clusters are any relationships existing between pairs of objects of those clusters, such as one or more relationships between objects of the micro services for searching and for finding prices.

If each of those micro-services has 10 network objects, there may be dozens of relationships, each being between any of the objects of the search service and any object of the price service. In a network object topology, map or graphic display, the communications between those services may look like a bunch of lines between any object of a macro-cluster to the left and any object of a macro-cluster to the right. There may be 100 lines between ones of the 10 objects on the left and the 10 on the right. This can be very confusing. So, by moving the topology abstraction layer up to the macro-cluster mapping, the search service can be one macro-cluster symbol (e.g., see cluster 150), the price service can be another macro-cluster symbol (e.g., see cluster 160) all of those relationships between their objects can be represented by a single relationship between the two macro-clusters (e.g., see relationship 186). They may look like just two large circles and one line between them which signifies/represents 100 possible different connections or relationships.

When a person looks at the representation or mappings of just the objects, it may be very difficult to understand where a performance problem is, while looking at the macro-clusters and relationships between macro-cluster is easy to understand. In terms of a diagram or graphic display, steps 320-350 provide the benefit of the ability to more efficiently and intuitively identify what is going on and simplify the presentation by detecting the micro services and communication/relationships of macro-clusters.

Determining and/or mapping at 330 may allow the macro-cluster to be viewed as a closed system. Here, it does not have to show or map what is in the macro-cluster, but can give some type of a service and show only macro-cluster 150 and 160, and relationship 186 without showing the network objects of those macro-clusters.

Determining and/or mapping may allow for more efficient network trouble shooting. When something goes wrong, an important question is—what is the topology or architecture of the network's macro-clusters? What units are in each macro-cluster? What are the relationships between macro-clusters and/or between network objects of the macro-clusters. Determining at 330 and displaying at 350 more quickly answers these questions than without the topology of the macro-clusters and relationships between macro-clusters.

There is a lot of value in being able to see that architecture by sub-assemblies or macro-clusters because it allows people to understand in the big picture when detecting where a problem exists. Is the car or network not working because of a problem in a certain sub-assembly or macro-clusters? It is easier to first detect if the problem is in a certain macro-clusters (e.g., a search micro-service or a price providing micro-service that feeds prices to the search micro-service) or sub-assembly (e.g., in the engine, in the transmission, in the steering wheel sub assembly)? Once the subassembly or macro-cluster having the problem is identified, then it is easy to isolate that and go deeper into the individual elements or network objects to see which is failing.

The topology of a macro-cluster having topology information showing a failure of the macro-cluster may be expanded to show the network objects of that macro-cluster, and those objects can be selected to show their topology information to determine if one of them is failing. Also, the topology of a relationship between macro-clusters having topology information showing a failure of the relationship can be expanded to show the relationships between the network objects of the two related macro-clusters, and those relationships can be selected to show their topology information to determine if one of them is failing.

The user input 174 may be used to select displaying the graph representation 230 of macro-clusters and relationship between macro-clusters of the topology information at a point in time during the period of time, and a further graph representation of the change between topology information for that point and time, and a) another point in time during the period of time, or b) a subsequent point in time during the subsequent period of time. In some cases, the input 174 may be used to select sequentially displaying the graph representation for a point in time and a further point and time during the period of time, and/or a subsequent point in time during the subsequent period of time.

FIG. 4 shows a graph representation 400 of macro-clusters 150 and 160, and relationship 186 between those macro-clusters of topology information of network objects of the computer communication network 100 for the selected application executing 114 on the selected network object 110*c* for a (e.g., a first) period of time. The graph representation 400 may be the graph representation 230 of macro-clusters and relationship between macro-clusters of the topology information 228 at a point in time during the (e.g., first) period of time at 360 of FIG. 3.

The graph representation 400 for the software application 114 shows the network object 110*b*, the network object 110*c* (the object where application 114 is executing and communicating from), the network object 110*d*, network object 110*e*, the cloud objects 140, the macro-cluster of objects 150 and the macro-cluster of objects 160.

It shows the selected software application 114 executing or running on the network object 110*c*; the related executing application 116 executing or running on the network object 110*e*; the network objects 110*c* and 110*e* independent or stand-alone network objects; the network objects 110*b* and 110*d* as part of macro-cluster of network objects 160; the network objects 110*f* and 110*g* as part of a cloud service network objects 140; and the network objects 110*h* and 110*i* as part of macro-cluster of network objects 150. Each of the network objects 110*b*-110*i*, and macro-clusters 150 and 160 is shown having connections, relationships and topology information as noted for FIGS. 1-3. Specifically, the graph representation 400 shows the network objects 110*b* and 110*d* as part of macro-cluster of network objects 160 and having relationship 182; the network objects 110*h* and 110*i* as part of macro-cluster of network objects 150 and having relationship 184; and the relationship 186 between macro-clusters 150 and 160.

It is noted that the network object 110*a* of the network 100 is not included in the graph representation 400, because it is not part of the topology information 228 at the point in time (e.g., during the period of time) selected for the display of the graph representation 400.

For each of these network objects, the graph representation 400 shows a graph representation of that network object; the unique key of that network object; the type of object of that network object; the types of relationships between that object and each network object connected to that object, the groupings for that network object, and time data for that network object. For each of the macro-clusters 150 and 160, and relationship 186 between those macro-clusters, the graph representation 400 shows a graph representation of that macro-cluster; the unique key of that macro-cluster; the type of object of that macro-cluster; the types of relationships between those macro-clusters and each macro-cluster connected to that macro-cluster, the groupings for that macro-cluster, and time data for that macro-cluster. The time data may be a change of the graph representation over time and/or a change of a showing of the metrics data for each of the macro-clusters 150 and 160, and relationship 186 between those macro-clusters over time. For example, some macro-clusters 150 and 160, and relationship 186 between those macro-clusters may be removed from and/or added to the representation; and/or small windows may be displayed next to each of the macro-clusters 150 and 160, and relationship 186 between those macro-clusters showing one or more metrics data for each object may be displayed.

Specifically, the graph representation 400 shows an image of a desktop or server computer for each network object a rectangle and a label for the groupings for each group of the network objects; and lists text representing each network object's unique key; type; relationships and time data for each of: the network object 110b, the network object 110c, the network object 110d, network object 110e, the cloud objects 140, the macro-cluster 150, the relationship 186 and the macro-cluster 160. The image of a desktop or server computer is only used representatively as the type of network object of each network object may vary widely as noted herein.

As noted at 350 of FIG. 3 the graph representation 230 and/or the topology information 228 may change over time. For instance, the input 174 may be used to select one or more of the graph representations 230 to be displayed for various points in time during period of time and/or during a subsequent period of time.

Displaying the representation 400 may be selected using user the input 174, such as described herein. Notably, an indicator on the display 172 may be slid forward along a time bar including the period of time and subsequent period of time to show the representation for a subsequent period of time and the changes therein.

Creating and/or displaying the representation 400 increases computer efficiency because it provides an efficient way of combining graph data with time dimension data and timeseries data for highly efficient access time for specific queries that are applicable for network management of macro-clusters and relationship between those macro-clusters.

Figure 5:
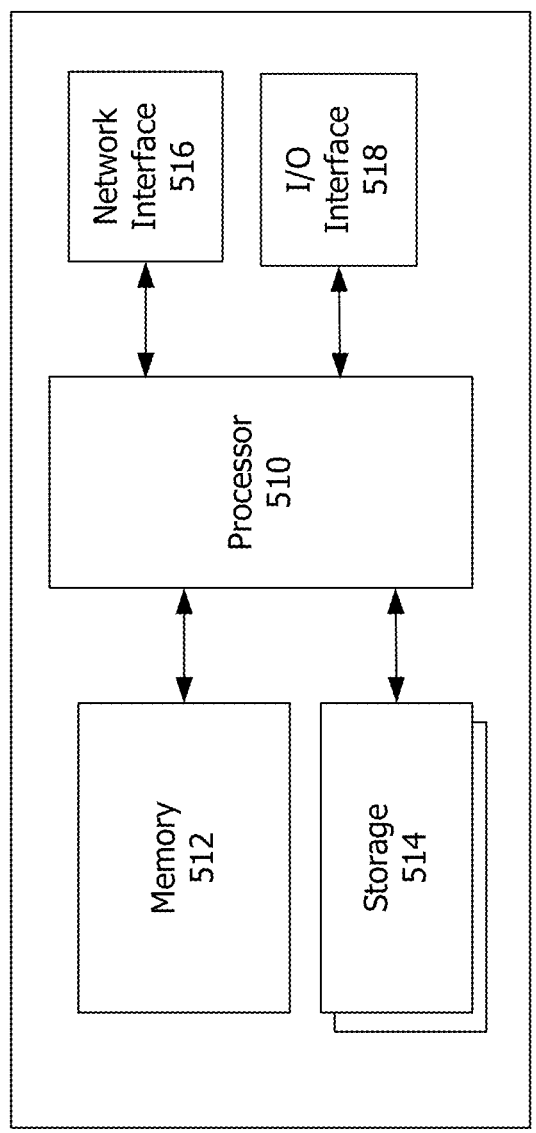
FIG. 5 is a block diagram of a computing device.

FIG. 5 is a block diagram of a computing device 500. The computing device 500 may be representative of the system 102, the I/O device 170, the server 130a, the object 120 and/or the object 130, herein. The computing device 500 may be a desktop or laptop computer, a server computer, a client computer, a network router, a network node, a network switch, a tablet, a smartphone or other mobile device. In some cases, it is a network object or element as described herein. The computing device 500 may include software and/or hardware for providing functionality and features described herein. The computing device 500 may therefore include one or more of: logic arrays, memories, analog circuits, digital circuits, software, firmware and processors. The hardware and firmware components of the computing device 500 may include various specialized units, circuits, software and interfaces for providing the functionality and features described herein. For example, a system of two physical network objects may provide continual automated discovering of the topology information of macro-clusters and relationship between those macro-clusters.

The computing device 500 has a processor 510 coupled to a memory 512, storage 514, a network interface 516 and an I/O interface 518. The processor 510 may be or include one or more microprocessors, field programmable gate arrays (FPGAs), application specific integrated circuits (ASICs), programmable logic devices (PLDs) and programmable logic arrays (PLAs).

The memory 512 may be or include RAM, ROM, DRAM, SRAM and MRAM, and may include firmware, such as static data or fixed instructions, BIOS, system functions, configuration data, and other routines used during the operation of the computing device 500 and processor 510. The memory 512 also provides a storage area for data and instructions associated with applications and data handled by the processor 510. As used herein the term "memory" corresponds to the memory 512 and explicitly excludes transitory media such as signals or waveforms.

The storage 514 provides non-volatile, bulk or long-term storage of data or instructions in the computing device 500. It may be internal or external storage. The storage 514 may take the form of a magnetic or solid-state disk, tape, CD, DVD, or other reasonably high capacity addressable or serial storage medium. Multiple storage devices may be provided or available to the computing device 500. Some of these storage devices may be external to the computing device 500, such as network storage or cloud-based storage. As used herein, the terms "storage" and "storage medium" correspond to the storage 514 and explicitly exclude transitory media such as signals or waveforms. In some cases, such as those involving solid-state memory devices, the memory 512 and storage 514 may be a single device.

The network interface 516 includes an interface to a network such as a network that can be used to communicate calls, signals, streams, arrays, flagged samples and feedback described herein. The network interface 516 may be wired or wireless.

The I/O interface 518 interfaces the processor 510 to peripherals (not shown) such as displays, video and still cameras, microphones, keyboards and USB devices.

In some cases, storage 514 is a non-volatile machine-readable storage medium that includes all types of computer readable media, including magnetic storage media, optical storage media, and solid-state storage media. It should be understood that the software can be installed in and sold with the system 102, the object 120 and/or the object 130. Alternatively, the software can be obtained and loaded into the system 102, the object 120 and/or the object 130, including obtaining the software via a disc medium or from any manner of network or distribution system, including from a server owned by the software creator or from a server not owned but used by the software creator. The software can be stored on a server for distribution over the Internet.

The technologies described herein provide various technological improvements to computer performance and efficiently. For example, the system 102, the object 120, the object 130, the process 300, and/or the computing device 500 provide a much more accurate and efficient device (and process) for displaying a graph representation of a topology of macro-clusters and relationship between those macro-clusters over time for a computer communication network. For example, the technologies described are technological improvements over those of the past because they can accurately, automatically and continually over time, discover topology information and display graph representations of the topology for macro-clusters and relationship between those macro-clusters of computer communication network.

More particularly, the technologies described provide computer network topology mapping tools, systems and/or devices that automatically discover the topology of macro-clusters and relationship between those macro-clusters of a network communicating at a large scale, store the topology and allow quick access to the topology information in a graphical display. The technologies described do not require access to sensitive information, or administrator or root level permissions. They perform repeated discovery over time, compare changes, address large scale topologies of macro-clusters and relationship between those macro-clusters and deal with missing critical data. They also automatically group resources (like a cluster or a service) and collect critical metrics for each macro-clusters and relationship between those macro-clusters. The technologies described also provide a graph representation of the topology of macro-clusters and relationship between those macro-clusters that mixes data that is not pure graphical and data that has a time dimension.

Within this description, the term "system" may mean a collection of hardware, which may be augmented by firmware and/or software, that performs the described functions. An engine may typically be designed using a hardware description language (HDL) that defines the engine primarily in functional terms. The HDL design may be verified using an HDL simulation tool. The verified HDL design may then be converted into a gate netlist or other physical description of the engine in a process commonly termed "synthesis". The synthesis may be performed automatically using a synthesis tool. The gate netlist or other physical description may be further converted into programming code for implementing the engine in a programmable device such as a field programmable gate array (FPGA), a programmable logic devices (PLD), or a programmable logic arrays (PLA). The gate netlist or other physical description may be converted into process instructions and masks for fabricating the engine within an application specific integrated circuit (ASIC).

Within this description, the term "system" may also mean a collection of hardware, firmware, and/or software, which may be on a larger scale than an "engine". For example, a system may contain multiple processors, some of which may perform similar functions in parallel. The term "system" does not imply any physical separation or demarcation. All or portions of one or more systems may be collocated on a common card, such as a network card 516, or within a common FPGA, ASIC, or other circuit device.

Although shown implemented in a computer, the processes and apparatus may be implemented with any computing device. A computing device as used herein refers to any device with a processor, memory and a storage device that may execute instructions including, but not limited to, personal computers, server computers, computing tablets, set top boxes, video game systems, personal video recorders, telephones, personal digital assistants (PDAs), portable computers, and laptop computers. These computing devices may run an operating system, including variations of the Linux, Microsoft Windows, Symbian, and Apple Mac operating systems.

The techniques may be implemented with machine readable storage media in a storage device included with or otherwise coupled or attached to a computing device. That is, the software may be stored in electronic, machine readable media. These storage media include magnetic media such as hard disks, optical media such as compact disks (CD-ROM and CD-RW) and digital versatile disks (DVD and DVD±RW); flash memory cards; and other storage media. As used herein, a storage device is a device that allows for reading and/or writing to a storage medium. Storage devices include hard disk drives, DVD drives, flash memory devices, and others.

The system 102, the object 120 and/or the object 130 may include hardware, software, firmware, or a combination thereof. Additional and fewer objects, modules or other arrangement of software, hardware and data structures may be used to achieve the processes and apparatuses described herein.

Closing Comments

Throughout this description, the technologies described and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one technology are not intended to be excluded from a similar role in other technologies.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method of mapping relationships between remote macro-clusters of a network object topology of a computer communication network, the method comprising:
    selecting a remote network object that has a relationship with a remote first macro-cluster of the network that includes a first set of the network objects, the network including a remote second macro-cluster that includes a second set of the network objects, the remote first macro-cluster having a relationship with the remote second macro-cluster;
    gathering at a first local network object:
        communication flow logs of the selected network object using an agent-less flow log source located within the first local network object that uses low level permissions;
        metric data from the selected network object using an agent-less metrics source located within the first local network object that uses low level permissions;

configuration data from the selected network object using an agent-less configuration source located within the first local network object that uses low level permissions;

generating at the first local network object, configuration data and time data for each network object of the first set of network objects and of the second set of network objects using the gathered flow log data, metric data and configuration data;

creating at a second local network object, remote network topology information using the configuration data and time data, wherein creating comprises:

automatically grouping network objects having a first common function into the first macro-cluster by creating a first number of abstraction layers by interpreting low level relations between first pairs of the network objects and collapsing a functional group of the first network objects into the first set of network object, and automatically grouping network objects having a second common function into the second macro-cluster by creating a second number of abstraction layers by interpreting low level relations between second pairs of the network objects and collapsing a functional groups of the second network objects into the second set of network objects; and determining:

a unique key for the first macro-cluster and the second macro-cluster that each uniquely identify each macro-cluster from other macro-clusters, the relationship between macro-clusters, the relationships between network objects and the network objects, time dimension data for the first macro-cluster and the second macro-cluster, a type of macro-cluster of each of the first macro-cluster and the second macro-cluster, and the type of macro-cluster is one of a micro-service, a cluster subset or a service subset, a remote macro-cluster relationship between a first network object of the first macro-cluster and a second network object of the second macro-cluster, wherein the relationship includes one of the first macro-cluster controlling actions performed by the second macro-cluster, the first macro-cluster depending on the second macro-cluster in order to operate correctly or the first macro-cluster streaming data to the second macro-cluster, a unique key for the remote macro-cluster relationship that uniquely identifies the relationship between the first and second macro-clusters from any other macro-cluster relationship, any network object and any macro-cluster, and remote macro-cluster topology information of the first set of the network objects and of the second set of the network objects; and storing at the second local network object, the topology information in a memory.

2. The method of claim 1, wherein gathering, generating and creating are performed for/over a first period of time;

wherein the network topology information is first network topology information for the first period of time, and further comprising:

gathering, generating and creating for/over a second period of time to create second network topology information for the second period of time; and transmitting a network error message if the second topology information does not include the relationship between the first macro-cluster and the second macro-cluster, and the topology information of the first set of the network objects and of the second set of the network objects.

3. The method of claim 1, wherein creating the network topology information comprises:

discovering a first network object relationship between a first network object of the first set of the network objects and a first network object of the second set of the network objects using the configuration data and time data, wherein the macro-cluster relationship includes the first network object relationship;

discovering a first set of network object relationships between pairs of network objects of the first set of the network objects using the configuration data and time data, wherein the macro-cluster topology information of the first set of the network objects includes the first set of network object relationships; and discovering a second set of network object relationships between pairs of network objects of the second set of the network objects using the configuration data and time data, wherein the macro-cluster topology information of the second set of the network objects includes the second set of network object relationships.

4. The method of claim 1, wherein:

the relationship between the remote network object and the first macro-cluster is between the remote network object and a first network object of the first set of the network objects.

5. The method of claim 4, wherein creating the network topology information of the first set of the network objects comprises using the configuration data and time data to determine:

unique keys of each of the first set of the network objects;

types of objects of at least some of the first set of the network objects;

types of relationships between pairs of the first set of the network objects; and time dimension data of the first set of the network objects; and wherein creating the network topology information of the second set of the network objects comprises using the configuration data and time data determine:

unique keys of each of the second set of the network objects;

types of objects of at least some of the second set of the network objects;

types of relationships between pairs of the second set of the network objects; and time dimension data of the second set of the network objects.

6. The method of claim 1, wherein:

the selected network object is one of the first set of network objects;

the flow log data is also from communication flow logs of the first set of network objects;

the metric data is also from the first set of network objects;

the configuration data is also from the first set of network objects; and the relationship between the first macro-cluster and the second macro-cluster comprises a relationship between a first network object of the first set of the network objects and a second network object of the second set of the network objects.

7. The method of claim 1, further comprising:
gathering the flow log, metric and configuration data over a period of time; and
changing the topology information over the period of time based on the flow log, metric and configuration data gathered over the period of time.

8. The method of claim 1, wherein:
the remote network object is one of a cloud based router, a cloud based switch or a cloud based flow logs providing service;
the first local network object is a cloud of the system that achieves gathering the flow logs, metric data and configuration data in a way that is independent of a specific cloud provider;
the flow logs source, metric data source and configuration data source are pluggable sources that can be deployed to various remote network objects to expand the first macro-cluster or fix a pluggable source that does not function correctly;
the flow logs are virtual private cloud (VPC) flow logs for network communication being performed by the remote network object;
the second local network object is a cloud of the system that achieves creating the topology information in a way that is independent of the specific cloud provider; and
the unique key for the first macro-cluster, the unique key for the second macro-cluster; and the unique key for the remote macro-cluster relationship are each a specific key of a set of internal unique keys provided by the cloud provider that represents each object within a cloud of the cloud provider.

9. The method of claim 1,
wherein each flow log includes at least the following fields: version, account-id, interface-id, srcaddr, dstaddr, srcport, dstport, protocol; the data in srcaddr is used to determine a source network object IP address; the data in dstaddr is used to determine a destination network object IP address, and a type of communication of the communication message of that log is determined based on the ports used by that communication identified in the log;
wherein the unique key of each macro-cluster is determined using at least one of:
adding a character to one of the network object keys of one of the network objects of that macro-cluster to create the key, or
sorting the keys of all that cluster's network objects and appending them to make a big key, or hashing them to create the key;
wherein the type of macro-cluster is based on at least one of:
the goal of the cluster,
software of the cluster or an application that the cluster implements; or
a similar goal that two or more network objects of the cluster are working towards;
wherein the macro-cluster relationship is at least one of:
based on the goal of the two clusters, software of the two clusters and/or an application that the two cluster implement; or
a similar goal that two or more network objects of the first clusters are working towards appended with a similar goal that two or more network objects of the second cluster are working towards.

10. The method of claim 1, wherein automatically grouping includes at least two of:

A) automatically detecting and segmenting as macro-clusters functional groups of micro-services from the micro-service's low level communication and configuration dependencies; then grouping sets of resources with a common function of a scaling group or a micro-service, and then collapsing or expanding a view from the sources of these functional groups; or B) looking at the topology information from a level of abstraction that is moved up to determine and/or map as a macro-cluster, any group of network objects that are performing actions to achieve a similar goal and/or expose other network objects to the outside of the group an interface for accessing a combined output of the group; or C) determining that the topology information includes a set of network objects having a certain or predetermined topology shape and/or set of relationships; or D) automatically grouping as a macro-cluster a predetermined threshold number of objects having a predetermined number or type of relationships between them in the network;

E) when two or more network objects communicating with an entry point object have a relationship with two or more other network objects; then the two or more network objects and entry point object are determined to be a macro-cluster;

F) when a single entry point receives a communication or data request via a relationship with an object not in a group, delegates the communication to one or more of internal objects of the group, then the group of network objects and single entry point object are determined to be a macro-cluster;

G) a macro-cluster is detected when all the requests/communications received from outside the group by the entry point balancer network object are distributed in a round-robin pattern between all the other network objects of the group; and H) a macro-cluster is detected when all the requests/communications received from outside the group by the entry point are symmetrically distributed to all resource type network objects of the group in a spoked or spiral pattern.

11. A system for mapping relationships between remote macro-clusters of a network object topology of a computer communication network, the system comprising:
a first local network object coupled to a first set and a second set of remote network objects, the first local network object for:
receiving a selection of a remote network object that has a relationship with a first remote macro-cluster of the network that includes a first set of the network objects, the network including a second remote macro-cluster that includes a second set of the network objects, the first remote macro-cluster having a remote relationship with the second remote macro-cluster;
gathering:
communication flow logs of the selected network object using an agent-less flow log source located within the first local network object that uses low level permissions;
metric data from the selected network object using an agent-less metrics source located within the first local network object that uses low level permissions;

configuration data from the selected network object using an agent-less configuration source located within the first local network object that uses low level permissions;

generating configuration data and time data for each network object of the first set of network objects and of the second set of network objects using the gathered flow log data, metric data and configuration data; and a second local network object coupled to the first local network object, the second local network object for:

creating remote network topology information using the configuration data and time data, wherein creating comprises:

automatically grouping network objects having a first common function into the first macro-cluster by creating a first number of abstraction layers by interpreting low level relations between first pairs of the network objects and collapsing a functional group of the first network objects into the first set of network object, and automatically grouping network objects having a second common function into the second macro-cluster by creating a second number of abstraction layers by interpreting low level relations between second pairs of the network objects and collapsing a functional groups of the second network objects into the second set of network objects; and determining:

a unique key for the first macro-cluster and the second macro-cluster that each uniquely identify each macro-cluster from other macro-clusters, the relationship between macro-clusters, the relationships between network objects and the network objects, time dimension data for the first macro-cluster and the second macro-cluster, a type of macro-cluster of each of the first macro-cluster and the second macro-cluster, and the type of macro-cluster is one of a micro-service, a cluster subset or a service subset, a remote macro-cluster relationship between a first network object of the first macro-cluster and a second network object of the second macro-cluster, wherein the relationship includes one of the first macro-cluster controlling actions performed by the second macro-cluster, the first macro-cluster depending on the second macro-cluster in order to operate correctly or the first macro-cluster streaming data to the second macro-cluster, a unique key for the remote macro-cluster relationship that uniquely identifies the relationship between the first and second macro-clusters from any other macro-cluster relationship, any network object and any macro-cluster, and remote macro-cluster topology information of the first set of the network objects and of the second set of the network objects; and storing the topology information in a local memory.

12. The system of claim 11, wherein:
the relationship between the remote network object and the first macro-cluster is between the remote network object and a first network object of the first set of the network objects.

13. The system of claim 12,
wherein creating the network topology information of the first set of the network objects comprises using the configuration data and time data to determine:
unique keys of each of the first set of the network objects;
types of objects of at least some of the first set of the network objects;
types of relationships between pairs of the first set of the network objects; and
time dimension data of the first set of the network objects; and
wherein creating the network topology information of the second set of the network objects comprises using the configuration data and time data to determine:
unique keys of each of the second set of the network objects;
types of objects of at least some of the second set of the network objects;
types of relationships between pairs of the second set of the network objects; and
time dimension data of the second set of the network objects.

14. The system of claim 11, wherein:
the selected network object is one of the first set of network objects;
the flow log data is also from communication flow logs of the first set of network objects;
the metric data is also from the first set of network objects;
the configuration data is also from the first set of network objects; and
the relationship between the first macro-cluster and the second macro-cluster comprises a relationship between a first network object of the first set of the network objects and a second network object of the second set of the network objects.

15. The system of claim 11, further comprising:
the first network object:
gathering the flow log, metric and configuration data over a period of time; and
the second network object:
changing the topology information over the period of time based on the flow log, metric and configuration data gathered over the period of time.

16. The system of claim 11, the system further comprising:
a user input device
a display device
a processor
a memory
wherein the processor and the memory comprise circuits and software for performing the mapping the network object topology.

17. A non-volatile machine readable medium storing a program having instructions which when executed by a processor will cause the processor to map relationships between macro-clusters of a network object topology of a computer communication network, the instructions of the program for:
receiving a selection of a remote network object that has a type of relationship with a first macro-cluster of the network that includes a first set of the network objects, the network including a second macro-cluster that includes a second set of the network objects, the first macro-cluster having a type of relationship with the second macro-cluster;

gathering:
　flow log data from communication flow logs of the selected network object using a flow log source;
　metric data from the selected network object using a metrics source;
　configuration data from the selected network object using a configuration source;
generating configuration data and time data for each network object of the first set of network objects and of the second set of network objects using the gathered flow log data, metric data and configuration data; and
creating network topology information using the configuration data and time data, wherein creating comprises:
　mapping a type of relationship between the first macro-cluster and the second macro-cluster, and
　mapping topology information of the first set of the network objects and of the second set of the network objects; and
storing the topology information in a memory.

18. The medium of claim 17, further comprising:
a user input device
a display device
a processor
a memory
wherein the processor and the memory comprise circuits and software for performing the instructions on the storage medium.

\* \* \* \* \*